(12) United States Patent
Cho et al.

(10) Patent No.: US 10,955,658 B2
(45) Date of Patent: *Mar. 23, 2021

(54) CAMERA AND TERMINAL INCLUDING THE SAME

(71) Applicant: LG ELECTRONICS INC., Seoul (KR)

(72) Inventors: Sunho Cho, Seoul (KR); Kwanhyung Kim, Seoul (KR); Dongryeol Lee, Seoul (KR); Hyungjoo Kang, Seoul (KR); Salkmann Ji, Seoul (KR); Samnyol Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/421,253

(22) Filed: May 23, 2019

(65) Prior Publication Data
US 2019/0361224 A1    Nov. 28, 2019

(30) Foreign Application Priority Data

May 23, 2018   (KR) .................. 10-2018-0058580
Sep. 4, 2018   (KR) .................. 10-2018-0105221

(51) Int. Cl.
*H04N 5/225*   (2006.01)
*H04N 5/232*   (2006.01)
(Continued)

(52) U.S. Cl.
CPC ......... *G02B 26/0883* (2013.01); *G01D 5/145* (2013.01); *G02B 7/1805* (2013.01);
(Continued)

(58) Field of Classification Search
CPC ............. H04N 5/2253; H04N 5/23251; H04N 5/2254; H04N 5/23287; H04N 5/2257;
(Continued)

(56) References Cited

U.S. PATENT DOCUMENTS 7,889,435 B2 *   2/2011   Seo ............... G02B 15/173
                                              359/672
8,662,762 B2 *   3/2014   Seo ............... G02B 15/06
                                              396/351
(Continued)

FOREIGN PATENT DOCUMENTS

JP   2006064958   3/2006
JP   2006133281   5/2006
(Continued)

OTHER PUBLICATIONS

PCT International Application No. PCT/KR2019/006186, International Search Report dated Sep. 20, 2019, 3 pages.
(Continued)

*Primary Examiner* — Lin Ye
*Assistant Examiner* — John H Morehead, III
(74) *Attorney, Agent, or Firm* — Lee, Hong, Degerman, Kang & Waimey

(57) ABSTRACT

A camera and a terminal including the same are disclosed. The camera according to an embodiment of the present invention includes: a first prism apparatus to reflect a first input light input in a first direction to a second direction; a second prism apparatus to reflect a second input light input in the first direction to the second direction, and output the reflected second input light to the first prism apparatus; a lens apparatus to receive the first input light from the first prism apparatus or the second input light from the second prism apparatus; and an image sensor to generate an image signal based on the first input light or the second input. Accordingly, it is possible to implement a slim camera that can use a single image sensor with respect to a plurality of cameras at the time of front photographing or rear photographing.

16 Claims, 32 Drawing Sheets

(51) Int. Cl.
  *G02B 7/04* (2006.01)
  *G02B 26/08* (2006.01)
  *G02B 7/18* (2021.01)
  *G01D 5/14* (2006.01)

(52) U.S. Cl.
  CPC ......... *H04N 5/2253* (2013.01); *H04N 5/2254* (2013.01); *H04N 5/23251* (2013.01); *G02B 7/04* (2013.01)

(58) Field of Classification Search
  CPC ............. H04N 5/23258; H04N 5/2328; G02B 26/0883; G02B 7/1805; G02B 7/04; G02B 7/1828; G02B 26/0816; G02B 27/646; G01D 5/145
  See application file for complete search history.

(56) References Cited

U.S. PATENT DOCUMENTS

| | | | | |
|---|---|---|---|---|
| 2005/0146801 | A1* | 7/2005 | Nagata | G02B 7/1805 359/811 |
| 2006/0017834 | A1* | 1/2006 | Konno | G02B 13/003 348/335 |
| 2006/0176578 | A1* | 8/2006 | Kimura | G11B 7/1367 359/719 |
| 2009/0009650 | A1* | 1/2009 | Liu | G02B 13/0055 348/340 |
| 2010/0328420 | A1* | 12/2010 | Roman | H04N 21/4788 348/14.08 |
| 2012/0287333 | A1* | 11/2012 | Huang | G03B 17/00 348/369 |
| 2014/0063322 | A1* | 3/2014 | Chan | H04N 5/2259 348/335 |
| 2015/0042870 | A1* | 2/2015 | Chan | G02B 13/009 348/357 |
| 2015/0092102 | A1 | 4/2015 | Chan | |
| 2015/0373252 | A1* | 12/2015 | Georgiev | G03B 3/06 348/349 |
| 2016/0202753 | A1* | 7/2016 | Lee | G06F 1/1639 345/8 |
| 2016/0353008 | A1* | 12/2016 | Osborne | G02B 13/0065 |
| 2016/0381346 | A1* | 12/2016 | Hsu | H04N 13/296 348/47 |
| 2017/0276954 | A1 | 9/2017 | Bajorins et al. | |
| 2018/0342045 | A1* | 11/2018 | Lutz | G06N 3/08 |
| 2018/0364494 | A1* | 12/2018 | Masahiro | G03B 5/06 |
| 2019/0361225 | A1* | 11/2019 | Cho | H04N 5/2254 |

FOREIGN PATENT DOCUMENTS

| | | |
|---|---|---|
| JP | 2007253705 | 10/2007 |
| KR | 1020080024785 | 3/2008 |
| KR | 1020080034726 | 4/2008 |
| KR | 1020090123546 | 12/2009 |
| KR | 1020120117239 | 10/2012 |

OTHER PUBLICATIONS

PCT International Application No. PCT/KR2019/006183, International Search Report dated Sep. 24, 2019, 3 pages.
United States Patent and Trademark Office U.S. Appl. No. 16/421,275, Office Action dated Apr. 15, 2020 , 17 pages.

* cited by examiner

CAMERA AND TERMINAL INCLUDING THE SAME

CROSS-REFERENCE TO RELATED APPLICATION

Pursuant to 35 U.S.C. § 119(a), this application claims the benefit of earlier filing date and right of priority to Korean Patent Application Nos. 10-2018-0058580, filed on May 23, 2018 and 10-2018-0105221, filed on Sep. 4, 2018, the contents of which are incorporated by reference herein in their entirety.

BACKGROUND OF THE INVENTION

1. Field of the Invention

The present invention relates to a camera, and a terminal including the same, and more particularly, to a slim camera for using a single image sensor with respect to a plurality of cameras at the time of a front photographing or a rear photographing, and a terminal including the camera.

2. Description of the Related Art

A camera is an apparatus for photographing an image. Recently, as a camera is employed in a mobile terminal, the research on the downsizing of a camera has been progressed.

Meanwhile, in addition to the downsizing trend of the camera, an auto focus function and an optical image stabilization (OIS) function are adopted.

Particularly, for performing optical image stabilization (OIS) function, it is important to accurately detect and compensate movement of dual prism caused by camera shake.

SUMMARY OF THE INVENTION

The present invention has been made in view of the above problems, and provides a slim camera capable of using a single image sensor with respect to a plurality of cameras at the time of a front photographing or a rear photographing, and a terminal including the camera.

The present invention further provides a camera capable of accomplishing camera shake compensation by independently rotating a dual prism, and a terminal including the camera.

In accordance with an aspect of the present invention, a camera includes: a first prism apparatus configured to reflect a first input light input in a first direction to a second direction; a second prism apparatus configured to reflect a second input light input in the first direction to the second direction, and output the reflected second input light to the first prism apparatus; a lens apparatus including a plurality of lenses adjusted for variable focus, and configured to receive the first input light from the first prism apparatus or the second input light from the second prism apparatus; and an image sensor configured to generate an image signal based on the first input light or the second input light passing through the lens apparatus.

The first prism apparatus includes: a first prism configured to reflect the first input light input in the first direction; and a second prism configured to reflect the first input light from the first prism and transmit the second input light from the second prism apparatus.

The first prism apparatus includes: a prism configured to reflect the first input light input in the first direction; and a beam splitter configured to reflect the first input light from the first prism and transmit the second input light from the second prism apparatus.

The first prism apparatus includes: a prism configured to reflect the first input light input in the first direction; and a rotating mirror configured to reflect the first input light from the first prism and transmit the second input light from the second prism apparatus.

The image sensor generates a first image signal based on the first input light passing through the lens apparatus in a first period, and generates a second image signal based on the second input light passing through the lens apparatus in a second period after the first period.

A resolution of a first image based on the first image signal is higher than a resolution of a second image based on the second image signal.

In the lens apparatus, a movement of lens in the lens apparatus during the first period is different from a movement of lens in the lens apparatus during the second period.

The camera further includes a lens disposed between the first prism apparatus and the second prism apparatus.

The first prism apparatus includes: a first actuator configured to change an angle of the first prism about a first rotation axis so as to change a first reflection direction, based on an inputted first control signal; and a second actuator configured to change an angle of the second prism about a second rotation axis so as to change a second reflection direction, based on an inputted second control signal.

The first prism receives an input light through a first entry prism surface and outputs the input light reflected from a first internal reflection surface through a first exit prism surface, and the second prism receives the reflected input light through a second entry prism surface and outputs the reflected light reflected from a second internal reflection surface through a second exit prism surface.

The first exit prism surface of the first prism and the second entry prism surface of the second prism face each other.

The first rotation axis of the first prism is perpendicular to the second rotation axis of the second prism.

In response to a movement causing rotation of the first prism about the first rotation axis by a first angle and rotation of the second prism about the second rotation axis by a second angle, the first actuator is configured to rotate the first prism in the first direction by a third angle in response to the first control signal, the second actuator is configured to rotate the second prism in a fourth direction opposite to the second direction by a fourth angle in response to the second control signal, the third angle is half of the first angle, and the fourth angle is half of the second angle.

The first prism apparatus includes: a first hall effect sensor configured to sense an angle change of the first prism based on a first magnetic field; and a second hall effect sensor configured to sense an angle change of the second prism based on a second magnetic field.

The first actuator includes a first drive magnet and a first drive coil.

The camera further includes: a first prism holder configured to secure the first prism; a first yoke coupled to a rear of the first prism holder; the first drive magnet coupled to a rear of the first yoke; a first coil holder including a plurality of protrusions protruding toward the first prism holder, wherein each of the plurality of protrusions includes an opening, and wherein the opening defines the first rotation axis, the first drive coil is disposed between the first coil holder and the first yoke, and the first prism holder includes a plurality of bosses coupled with the openings of the plurality of protrusions so as to rotate the first prism about the first rotation axis.

The second actuator includes a second drive magnet and a second drive coil.

The camera further includes: a second prism holder configured to secure the second prism; a second yoke coupled to a rear of the second prism holder; the second drive magnet coupled to a rear of the second yoke; a second coil holder including a plurality of protrusions protruding toward the second prism holder, wherein each of the plurality of protrusions includes an opening, and wherein the opening defines the second rotation axis, wherein the second drive coil is disposed between the second coil holder and the second yoke, wherein the second prism holder includes a plurality of bosses coupled with the openings of the plurality of protrusions so as to rotate the second prism about the second rotation axis.

The camera further includes: a gyro sensor configured to sense a movement of the camera; and a drive controller configured to generate the first control signal and the second control signal for stabilizing an image being captured by the image sensor, wherein the first control signal is based on the angle change of the first prism caused by the movement, and the second control signal is based on the angle change of the second prism caused by the movement.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE PREFERRED EMBODIMENTS

Hereinafter, the present invention will be described in detail with reference to the accompanying drawings. With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1A:
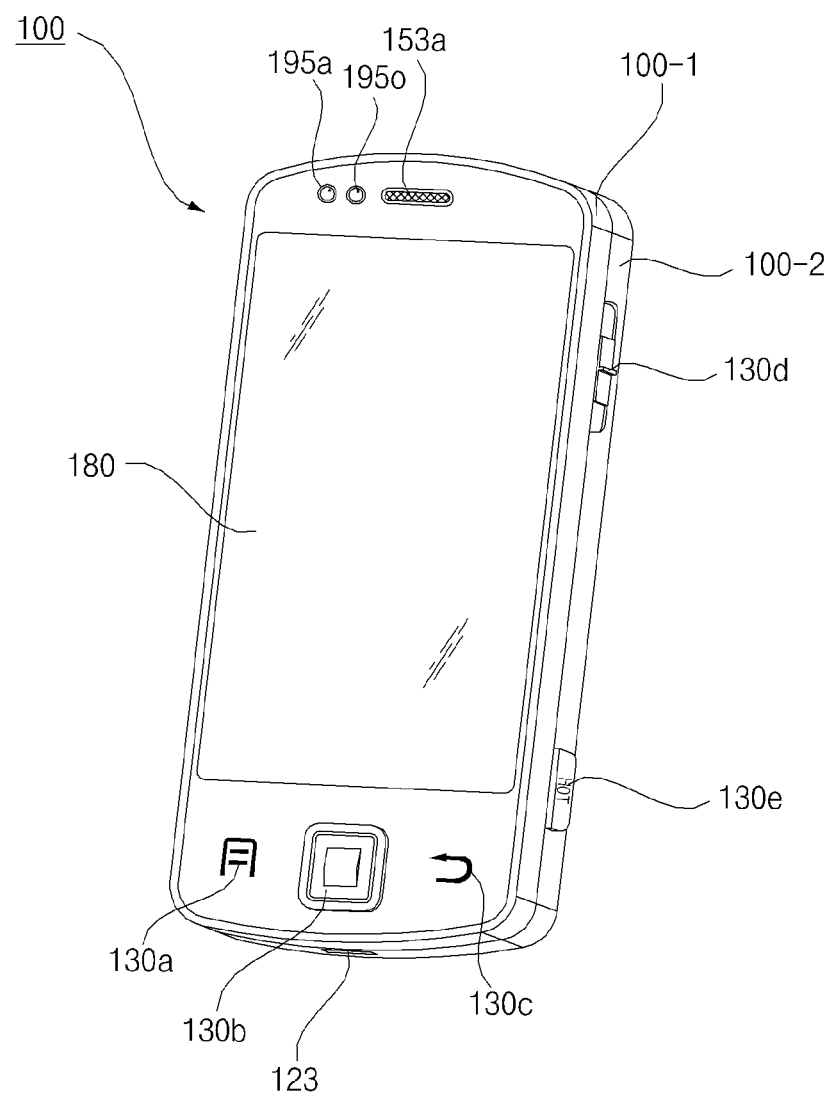
FIG. 1A is a perspective view of a mobile terminal as an example of a terminal according to an embodiment of the present invention.
Figure 1B:
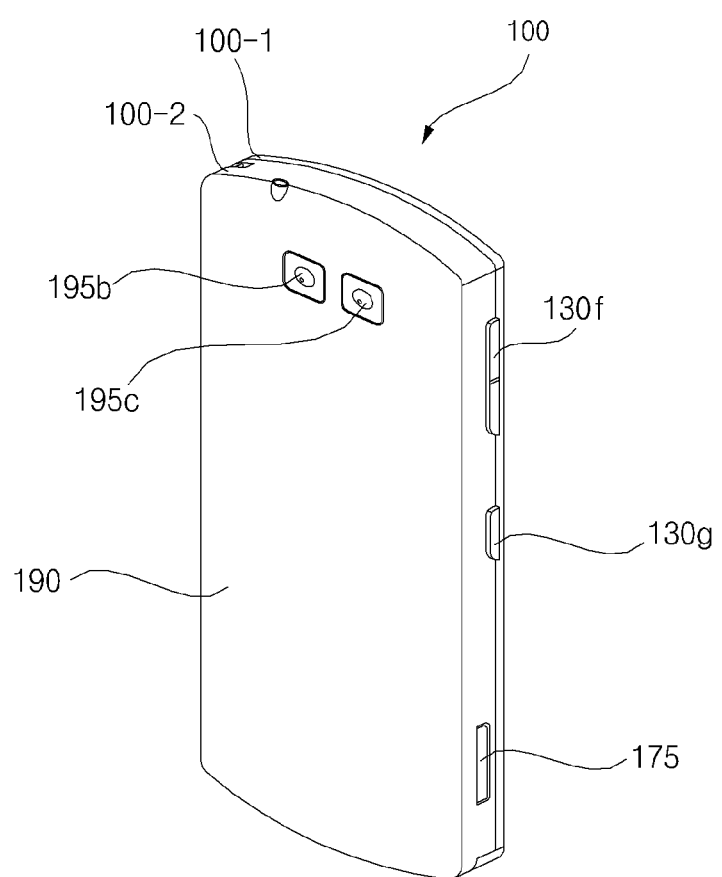
FIG. 1B is a rear perspective view of a mobile terminal shown in FIG. 1A.

FIG. 1A is a perspective view of a mobile terminal as an example of an image display apparatus according to an embodiment of the present invention, and FIG. 1B is a rear perspective view of the mobile terminal shown in FIG. 1A.

Referring to FIG. 1A, a case forming an outer appearance of a mobile terminal 100 may be formed by a front case 100-1 and a rear case 100-2. Various electronic components may be embedded in a space formed by the front case 100-1 and the rear case 100-2.

Specifically, a display 180, a first sound output module 153a, a first camera 195a, a second camera 195o, and a first to third user input units 130a, 130b, and 130c may be disposed in the front case 100-1. Further, a fourth user input unit 130d, a fifth user input unit 130e, and a microphone 123 may be disposed on a lateral surface of the rear case 100-2.

In the display 180, a touchpad may be overlapped in a layer structure so that the display 180 may operate as a touch screen.

The first sound output module 153a may be implemented in the form of a receiver or a speaker. The first camera 195a may be implemented in a form suitable for photographing an image or a moving image of a user, and the like. The microphone 123 may be implemented in a form suitable for receiving a user's voice, other sounds, and the like.

The first to fifth user input units 130a, 130b, 130c, 130d and 130e and a sixth and seventh user input units 130f and 130g described below may be collectively referred to as a user input unit 130.

The microphone 123 may be disposed in the lower side of the rear case 100-2, i.e., in the lower side of the mobile terminal 100, so as to collect an audio signal. Otherwise the microphone 123 may be disposed in the upper side of the rear case 100-2, i.e., in the upper side of the mobile terminal 100, so as to collect an audio signal.

Referring to FIG. 1B, a third camera 195b, a fourth camera 195c, and a fourth microphone (not shown) may be additionally mounted on the rear surface of the rear case 100-2, and a sixth and seventh user input units 130f and 130g, and an interface 175 may be disposed on the lateral surface of the rear case 100-2.

The third camera 195b has a photographing direction substantially opposite to that of the first camera 195a, and may have different pixels from the first camera 195*a*. A flash (not shown) and a mirror (not shown) may be additionally disposed adjacent to the third camera 195*b*. In addition, another camera may be installed adjacent to the third camera 195*b* to be used for shooting a three-dimensional stereoscopic image.

A second sound output module (not shown) may be additionally disposed in the rear case 100-2. The second sound output module may implement a stereo function together with the first sound output module 153*a*, and may be used for talking in a speakerphone mode.

A power supply unit 190 for supplying power to the mobile terminal 100 may be mounted in the rear case 100-2. The power supply unit 190 may be, for example, a rechargeable battery and may be detachably coupled to the rear case 100-2 for charging or the like.

The microphone 123 may be disposed in the front surface of the rear case 100-2, i.e., in the rear surface of the mobile terminal 100 so as to collect an audio signal.

Figure 2:
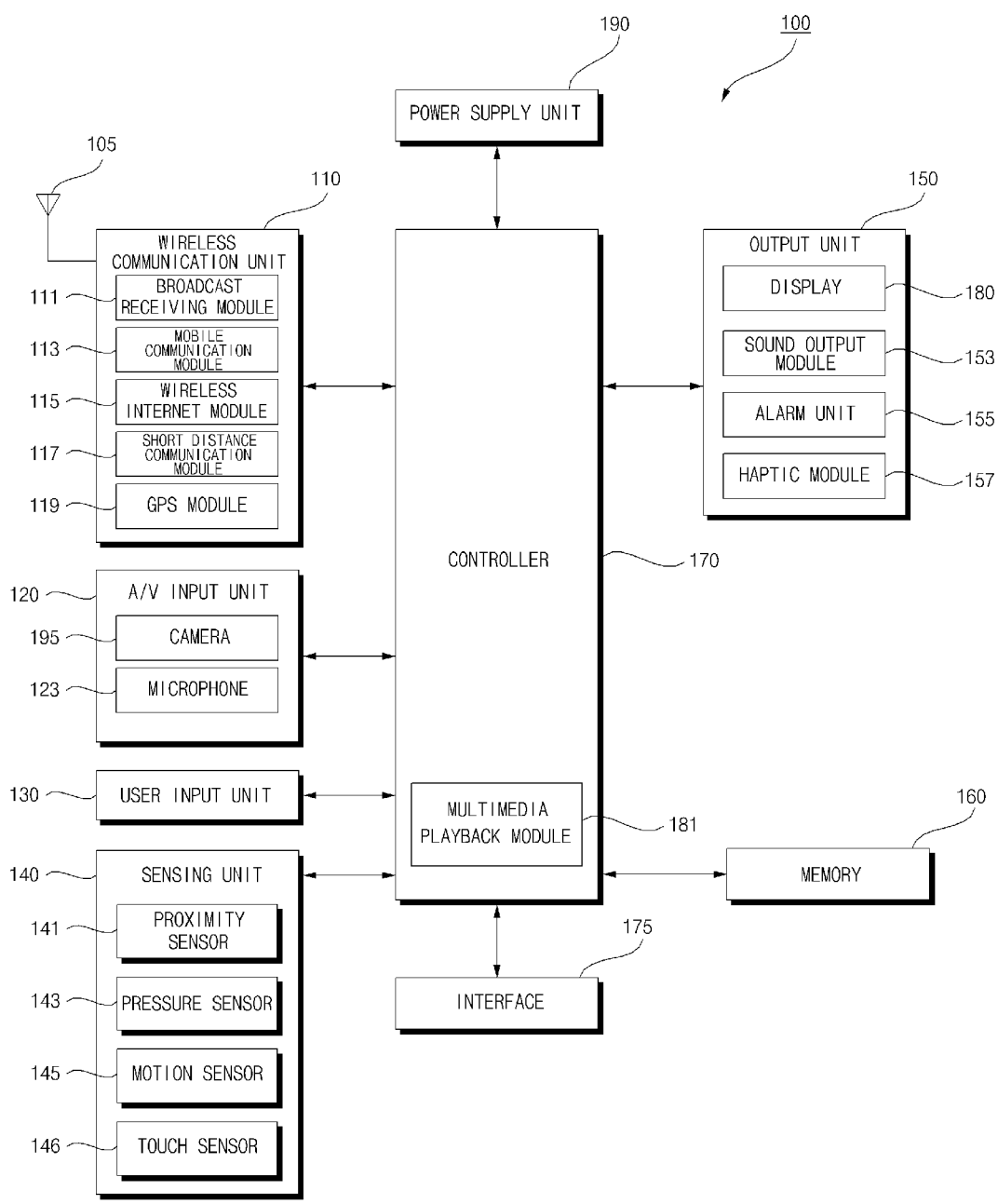
FIG. 2 is a block diagram of a mobile terminal of FIG. 1 according to an embodiment of the present invention.

FIG. 2 is a block diagram of a mobile terminal of FIG. 1 according to an embodiment of the present invention.

Referring to FIG. 2, the mobile terminal 100 may include a wireless communication unit 110, an audio/video (A/V) input unit 120, a user input unit 130, a sensing unit 140, an output unit 150, a memory 160, an interface 175, a controller 170, and a power supply unit 190. When these components are implemented in an actual application, two or more components may be combined into one component if necessary, or one component may be divided into two or more components.

The wireless communication unit 110 may include a broadcast receiving module 111, a mobile communication module 113, a wireless Internet module 115, a short distance communication module 117, and a GPS module 119.

The broadcast receiving module 111 may receive at least one of a broadcast signal and broadcast related information from an external broadcast management server through a broadcast channel. The broadcast signal and/or broadcast related information received through the broadcast receiving module 111 may be stored in the memory 160.

The mobile communication module 113 may transmit and receive a wireless signal to at least one of a base station, an external terminal, and a server on a mobile communication network. Here, the wireless signal may include various types of data in accordance with a voice call signal, a video call signal, or a character/multimedia message transmission/reception.

The wireless Internet module 115 refers to a module for wireless Internet access, and the wireless Internet module 115 may be embedded in the mobile terminal 100 or externally provided.

The short distance communication module 117 refers to a module for short distance communication. BLUETOOTH, Radio Frequency Identification (RFID), infrared Data Association (IrDA), Ultra Wideband (UWB), ZigBee, and Near Field Communication (NFC) may be used as a short distance communication technology.

The Global Position System (GPS) module 119 may receive position information from a plurality of GPS satellites.

The audio/video (A/V) input unit 120 may be used to input an audio signal or a video signal, and may include a camera 195, the microphone 123, and the like.

The camera 195 may process an image frame such as a still image or a moving image acquired by an image sensor in a video call mode or a photographing mode. Then, the processed image frame may be displayed on the display 180.

The image frame processed by the camera 195 may be stored in the memory 160 or transmitted to the outside through the wireless communication unit 110. Two or more cameras 195 may be provided according to the configuration of the terminal.

The microphone 123 may receive an external audio signal by a microphone in a display off mode, e.g., a call mode, a recording mode, or a voice recognition mode, and may process the audio signal into an electrical voice data.

Meanwhile, a plurality of microphones 123 may be disposed in different positions. The audio signal received in each microphone may be audio-signal processed in the controller 170, or the like.

The user input unit 130 may generate key input data that the user inputs for controlling the operation of the terminal. The user input unit 130 may include a key pad, a dome switch, and a touch pad (static pressure scheme/capacitive scheme) capable of receiving a command or information by a user's pressing or touching operation. In particular, when the touch pad has a mutual layer structure with the display 180 described later, it may be referred to as a touch screen.

The sensing unit 140 may detect the current state of the mobile terminal 100 such as the open/close state of the mobile terminal 100, the position of the mobile terminal 100, the contact of the user, and the like, and may generate a sensing signal for controlling the operation of the mobile terminal 100.

The sensing unit 140 may include a proximity sensor 141, a pressure sensor 143, a motion sensor 145, a touch sensor 146, and the like.

The proximity sensor 141 may detect an object approaching the mobile terminal 100 or an object in the vicinity of the mobile terminal 100 without mechanical contact. In particular, the proximity sensor 141 may detect a nearby object by using a change in the alternating magnetic field or a change in the static magnetic field, or by using a change rate of the capacitance.

The pressure sensor 143 may detect whether a pressure is applied to the mobile terminal 100, or detect the magnitude of the pressure, and the like.

The motion sensor 145 may detect the position or motion of the mobile terminal 100 by using an acceleration sensor, a gyro sensor, or the like.

The touch sensor 146 may detect a touch input by a user's finger or a touch input by a specific pen. For example, when a touch screen panel is disposed on the display 180, the touch screen panel may include a touch sensor 146 for sensing position information and intensity information of the touch input. A sensing signal sensed by the touch sensor 146 may be transmitted to the controller 180.

The output unit 150 may be used to output an audio signal, a video signal, or an alarm signal. The output unit 150 may include a display 180, a sound output module 153, an alarm unit 155, and a haptic module 157.

The display 180 may display and output information processed by the mobile terminal 100. For example, when the mobile terminal 100 is in the call mode, a user interface (UI) or graphic user interface (GUI) related with the call may be displayed. When the mobile terminal 100 is in the video call mode or the photographing mode, the photographed or received image may be displayed individually or simultaneously, and the UI and the GUI may be displayed.

Meanwhile, as described above, when the display 180 and the touch pad form a mutual layer structure to constitute a touch screen, the display 180 may be used as an input apparatus capable of inputting information by a user's touch in addition to an output apparatus.

The sound output module 153 may output the audio data received from the wireless communication unit 110 or stored in the memory 160 in a call signal reception, a call mode or a recording mode, a voice recognition mode, a broadcast reception mode, and the like. In addition, the sound output module 153 may output an audio signal related to the function performed in the mobile terminal 100, e.g., a call signal reception tone, a message reception tone, and the like. The sound output module 153 may include a speaker, a buzzer, and the like.

The alarm unit 155 may output a signal for notifying the occurrence of an event of the mobile terminal 100. The alarm unit 155 may output a signal for notifying the occurrence of an event in a different form from an audio signal or a video signal. For example, it is possible to output a signal in a form of vibration.

The haptic module 157 may generate various tactile effects that the user can feel. A typical example of the tactile effect generated by the haptic module 157 may be a vibration effect. When the haptic module 157 generates vibration with a tactile effect, the intensity and pattern of the vibration generated by the haptic module 157 can be converted, and different vibrations may be synthesized to be outputted or may be sequentially outputted.

The memory 160 may store a program for the processing and controlling of the controller 170, and may serve to temporarily store inputted or outputted data (e.g., a phone book, a message, a still image, a moving image, or the like).

The interface 175 may serve as an interface with all external apparatuses connected to the mobile terminal 100. The interface 175 may receive data from an external apparatus or receive power from the external apparatus to transmit to each component in the mobile terminal 100, and allow the data in the mobile terminal 100 to be transmitted to the external apparatus.

The controller 170 may control, in general, the operation of each unit to control the overall operation of the mobile terminal 100. For example, the controller 170 may perform relevant control and processing for voice call, data communication, video call, and the like. In addition, the controller 170 may include a multimedia playback module 181 for playing multimedia. The multimedia playback module 181 may be configured in hardware inside the controller 170 or may be configured in software separately from the controller 170. Meanwhile, the controller 170 may include an application processor (not shown) for driving an application. Alternatively, the application processor (not shown) may be provided separately from the controller 170.

The power supply unit 190 may receive external power or internal power under the control of the controller 170 to supply power required for operation of each component.

Figure 3A:
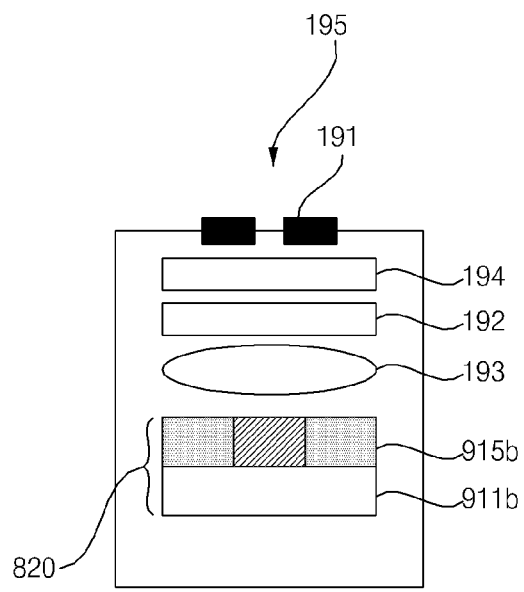
FIG. 3A is an internal cross-sectional view of a camera of FIG. 2 according to an embodiment of the present invention.

FIG. 3A is an internal cross-sectional view of a camera of FIG. 2.

Referring to the drawing, FIG. 3A is an example of a cross-sectional view of the camera 195.

The camera 195 may include an aperture 191, first and second prism apparatuses 192 and 194, a lens apparatus 193, and an image sensor 820.

The aperture 191 may open and close the light input on the lens apparatus 193.

The image sensor 820 may include an RGB filter 915b, and a sensor array 911b for converting an optical signal into an electric signal, in order to sense RGB colors.

Accordingly, the image sensor 820 may sense and output RGB images, respectively.

Figure 3B:
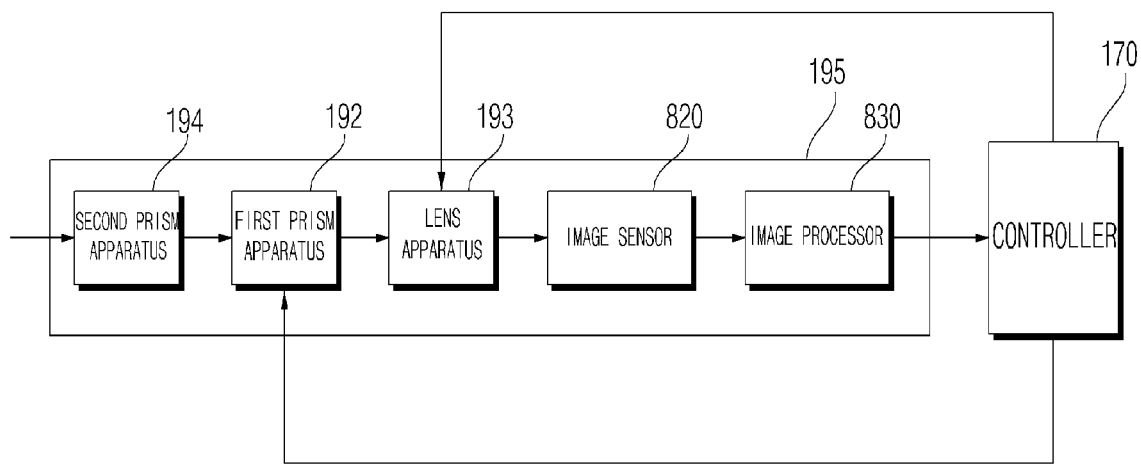
FIG. 3B is an internal block diagram of a camera of FIG. 2 according to an embodiment of the present invention.

FIG. 3B is an internal block diagram of a camera of FIG. 2.

Referring to the drawing, FIG. 3B is an example of a block diagram for the camera 195.

The camera 195 may include the first and second prism apparatuses 192 and 194, the lens apparatus 193, the image sensor 820, and an image processor 830.

The first prism apparatus 192 reflects a first input light Ria input in a first direction (−z direction) into a second direction (y direction).

The second prism apparatus 194 reflects a second input light Rib input in the first direction (−z direction) into the second direction (y direction), and outputs the reflected light to the first prism apparatus 192.

The lens apparatus 193 receives the first input light Ria from the first prism apparatus 592 or the second input light Rib from the second prism apparatus 194, and may be provided with a plurality of lenses that are adjusted for variable focus.

The image processor 830 may generate an RGB image based on an electrical signal from the image sensor 820.

In particular, the image processor 830 may generate an image signal based on the first input light Ria or the second input light Rib passing through the lens apparatus 193.

Accordingly, it is possible to implement the slim camera 195 that can use a single image sensor 820 with respect to a plurality of cameras at the time of the front photographing or the rear photographing.

Meanwhile, the image sensor 820 may adjust an exposure time based on the electric signal.

Meanwhile, the RGB image from the image processor 830 may be transmitted to the controller 170 of the mobile terminal 100.

Meanwhile, the controller 170 of the mobile terminal 100 may output a control signal to the lens apparatus 193 for the movement of a lens in the lens apparatus 193. For example, a control signal for autofocusing may be outputted to the lens apparatus 193.

Meanwhile, the controller 170 of the mobile terminal 100 may output an aperture control signal in the first and second prism apparatuses 192 and 194 to the first and second prism apparatuses 192 and 194.

For example, in a first period, the controller 170 of the mobile terminal 100 may control the aperture in the first prism apparatus 192 to be opened and control the aperture in the second prism apparatus 194 to be closed so that only the first prism apparatus 192 among the first and second prism apparatuses 192 and 194 can operate.

As another example, in a second period, the controller 170 of the mobile terminal 100 may control the aperture in the second prism apparatus 194 to be opened and control the aperture in the first prism apparatus 192 to be closed so that only the second prism apparatus 194 among the first and second prism apparatuses 192 and 194 can operate.

Accordingly, the image sensor 820 may generate a first image signal based on the first input light Ria passing through the lens apparatus 193 in the first period, and generate a second image signal based on the second input light Rib passing through the lens apparatus 193, in the second period after the first period.

Meanwhile, the controller 170 of the mobile terminal 100 may control the resolution of the first image based on the first image signal to be higher than the resolution of the second image based on the second image signal.

More specifically, the controller 170 of the mobile terminal 100 may control the movement of the lens in the lens apparatus 193 during the first period and the movement of the lens in the lens apparatus 193 during the second period to be different from each other.

For example, the controller 170 of the mobile terminal 100 may control the distance between the lens in the lens apparatus 193 and the image sensor 820 to be decreased so as to acquire a high resolution image signal during the first period, and control the distance between the lens in the lens apparatus 193 and the image sensor 820 to be increased so as to acquire a low resolution image signal during the second period.

When the first and second prism apparatuses 192 and 194 are provided with a module for preventing the optical image stabilization function respectively, the controller 170 of the mobile terminal 100 may output a control signal for the optical image stabilization function to the first and second prism apparatuses 192 and 194. The operation of the optical image stabilization function in the first and second prism apparatuses 192 and 194 will be described with reference to FIG. 3C and FIG. 3D.

Figure 3C:
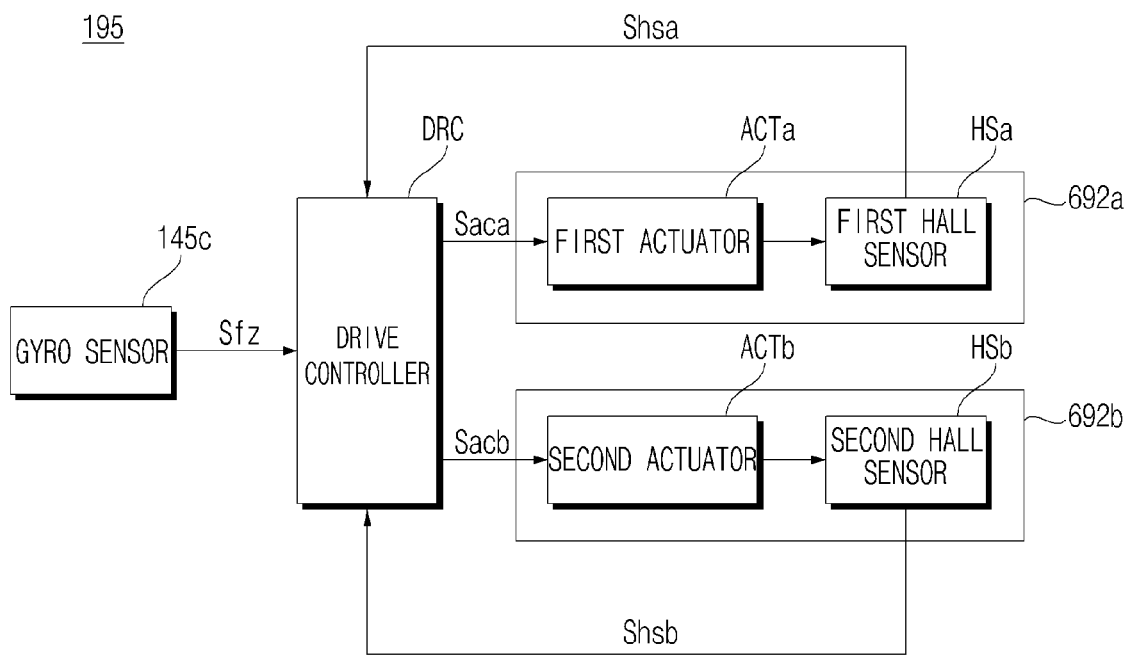
FIG. 3C and FIG. 3D are various examples of the internal block diagram of the camera of FIG. 2 according to embodiments of the present invention.
Figure 3D:
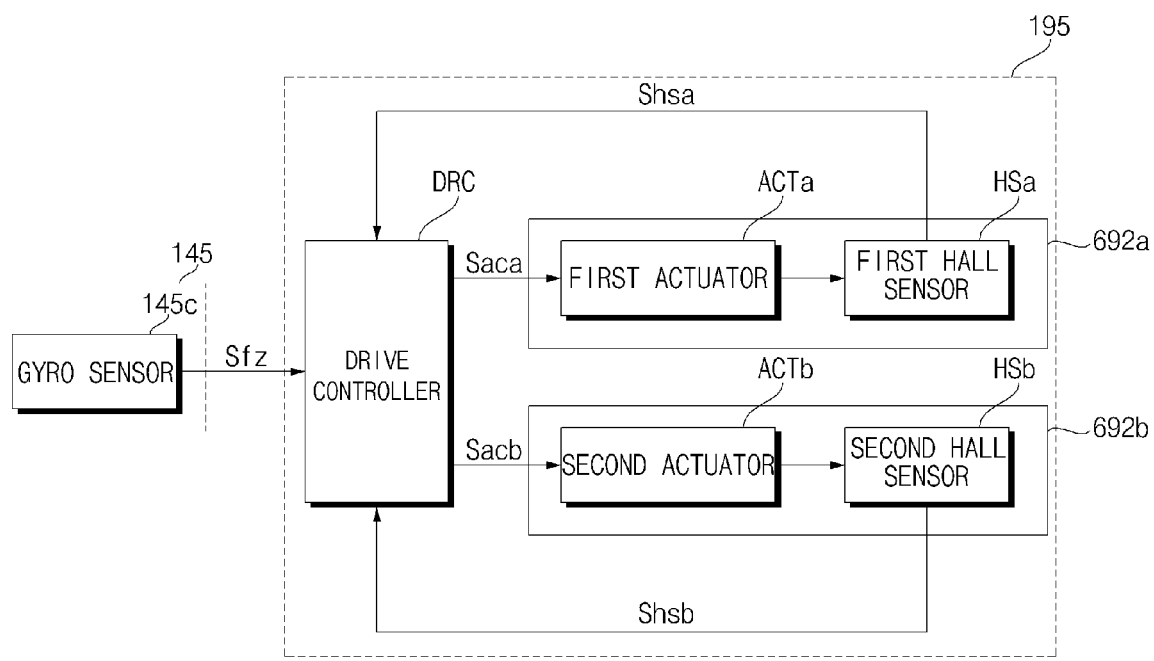

FIG. 3C and FIG. 3D are various examples of the internal block diagram of the camera of FIG. 2.

Firstly, FIG. 3C illustrates that a gyro sensor 145c, a drive controller DRC, a first prism module 692a, and a second prism module 692b are provided inside the camera 195.

The gyro sensor 145c may detect a first direction motion and a second direction motion. The gyro sensor 145c may output motion information Sfz including the first direction motion and the second direction motion.

The drive controller DRC may output control signals Saca and Sacb for the motion compensation to the first prism module 692a and the second prism module 692b respectively, based on the motion information Sfz including the first direction motion and the second direction motion from the gyro sensor 145c.

In particular, the drive controller DRC may output the control signal to a first actuator ACTa in the first prism module 692a and a second actuator ACTb in the second prism module 692b.

A first control signal Saca may be a control signal for the compensation of the first direction motion sensed by the gyro sensor 145c, and a second control signal Sacb may be a control signal for the compensation of the second direction motion sensed by the gyro sensor 145c.

The first actuator ACTa may change the angle of a first prism PSMa based on a first rotation axis, based on the first control signal Saca.

The second actuator ACTb may change the angle of a second prism PSMb based on a second rotation axis, based on the second control signal Sacb.

Meanwhile, a first hall effect sensor HSa in the first prism module 692a and a second hall effect sensor Hsb in the second prism module 692b may sense the change of the magnetic field so as to check movement information due to the movement of the first prism PSMa and the second prism PSMb.

In detail, a first hall effect sensor HSa may sense an angle change of the first prism PSMa caused by the movement based on a first magnetic field, and a second hall effect sensor HSb may sense an angle change of the second prism PSMb caused by the movement based on a second magnetic field.

In addition, the motion information sensed by the first hall effect sensor HSa and the second hall effect sensor HSb, particularly, first and second magnetic field change information Shsa and Shsb may be input to the drive controller DRC.

The drive controller DRC may perform a PI control or the like, based on the control signals Saca and Sacb for the motion compensation and the motion information, particularly, the first and second magnetic field change information Shsa and Shsb, thereby accurately controlling the motion of the first prism PSMa and the second prism PSMb.

That is, the drive controller DRC may perform a closed loop by receiving the information Shsa and Shsb sensed by the first hall effect sensor HSa and the second hall effect sensor HSb, and can accurately control the motion of the first prism PSMa and the second prism PSMb.

Next, although FIG. 3D is similar to FIG. 3C, there exists a difference in that the gyro sensor 145c is provided not in the camera 195, but in the motion sensor 145 of a separate sensing unit 140 inside the mobile terminal 100.

Accordingly, although not shown in FIG. 3D, the camera 195 in FIG. 3D may further include an interface (not shown) for receiving a signal from an external gyro sensor 145c.

Meanwhile, the motion information Sfz including the first directional motion and the second direction motion received from the gyro sensor 145c may be inputted to the drive controller DRC. The operation of the drive controller may be the same as that of FIG. 3C.

Figure 4A:
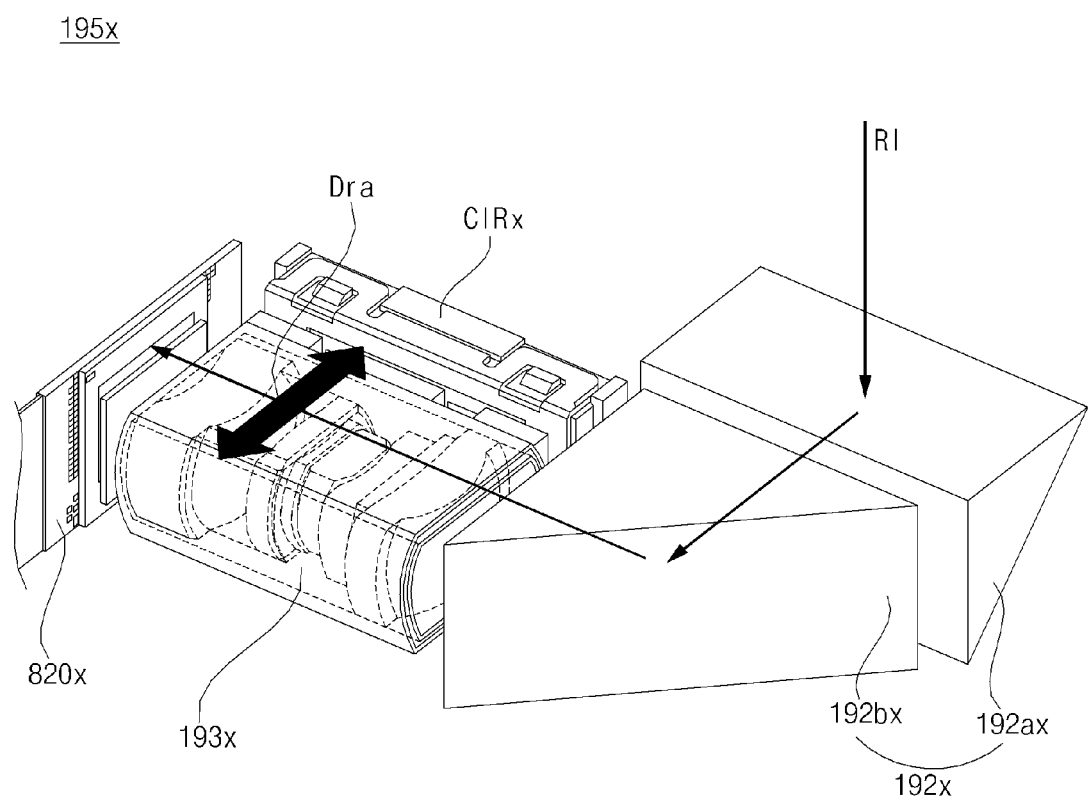
FIG. 4A is a diagram illustrating a camera having a dual prism structure according to an embodiment of the present invention.

FIG. 4A is a diagram illustrating a camera having a dual prism structure.

Referring to the drawing, a camera 195x of FIG. 4A may include an image sensor 820x, a lens apparatus 193x for transmitting light to the image sensor, a lens driving unit (CIRx) for moving a lens inside the lens apparatus 193x, and a dual prism apparatus 192x having a first prism 192ax and a second prism 192bx.

The camera 195x of FIG. 4A may perform the movement of the lens apparatus 193x in order to perform optical image stabilization (OIS). In the drawing, it is illustrated that the compensation is performed in the Dra direction.

This method has a disadvantage that, when the optical zoom of the lens apparatus 193x is high, the optical image stabilization (OIS) should be performed more. Therefore, the accuracy of the optical image stabilization (OIS) may be reduced.

In addition, in this case, the lens movement direction should intersect with the Dra direction, so that it is difficult to simultaneously achieve the lens movement and the movement for performing optical image stabilization (OIS).

In the present invention, in order to compensate for this, it is assumed that the optical image stabilization (OIS) is implemented inside the prism module, and the angle compensation is performed, in particular, by using a rotary actuator. According to this, by performing the angle compensation, there is an advantage that it is enough to compensate only an angle within a given range, regardless of whether the optical zoom of the lens apparatus 193x is low or high. For example, a plurality of prism modules may be used to compensate a first angle in first and second rotational axis directions, respectively. Accordingly, regardless of the optical zoom, since the angle compensation within a given range becomes possible, the accuracy of optical image stabilization (OIS) can be improved. This will be described with reference to FIG. 7.

Figure 4B:
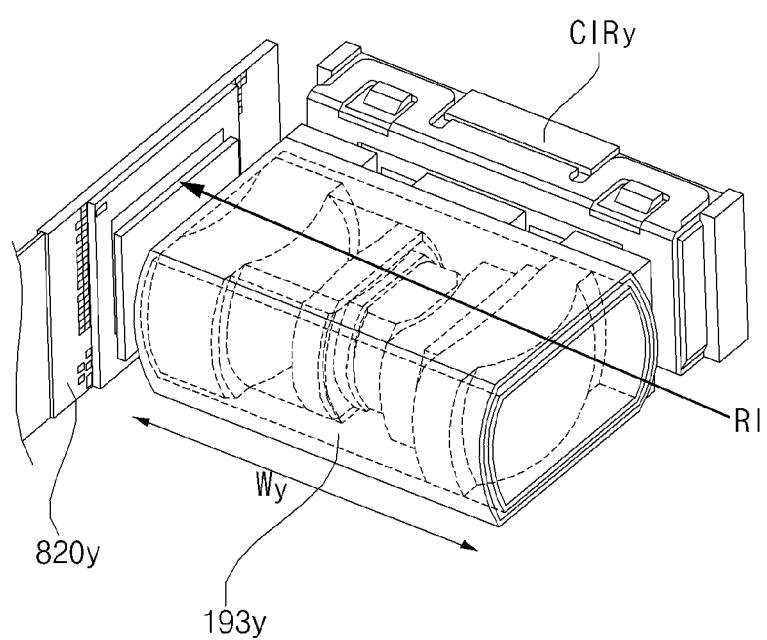
FIG. 4B and FIG. 4C are diagrams illustrating a camera in which a dual prism structure is omitted.
Figure 4C:
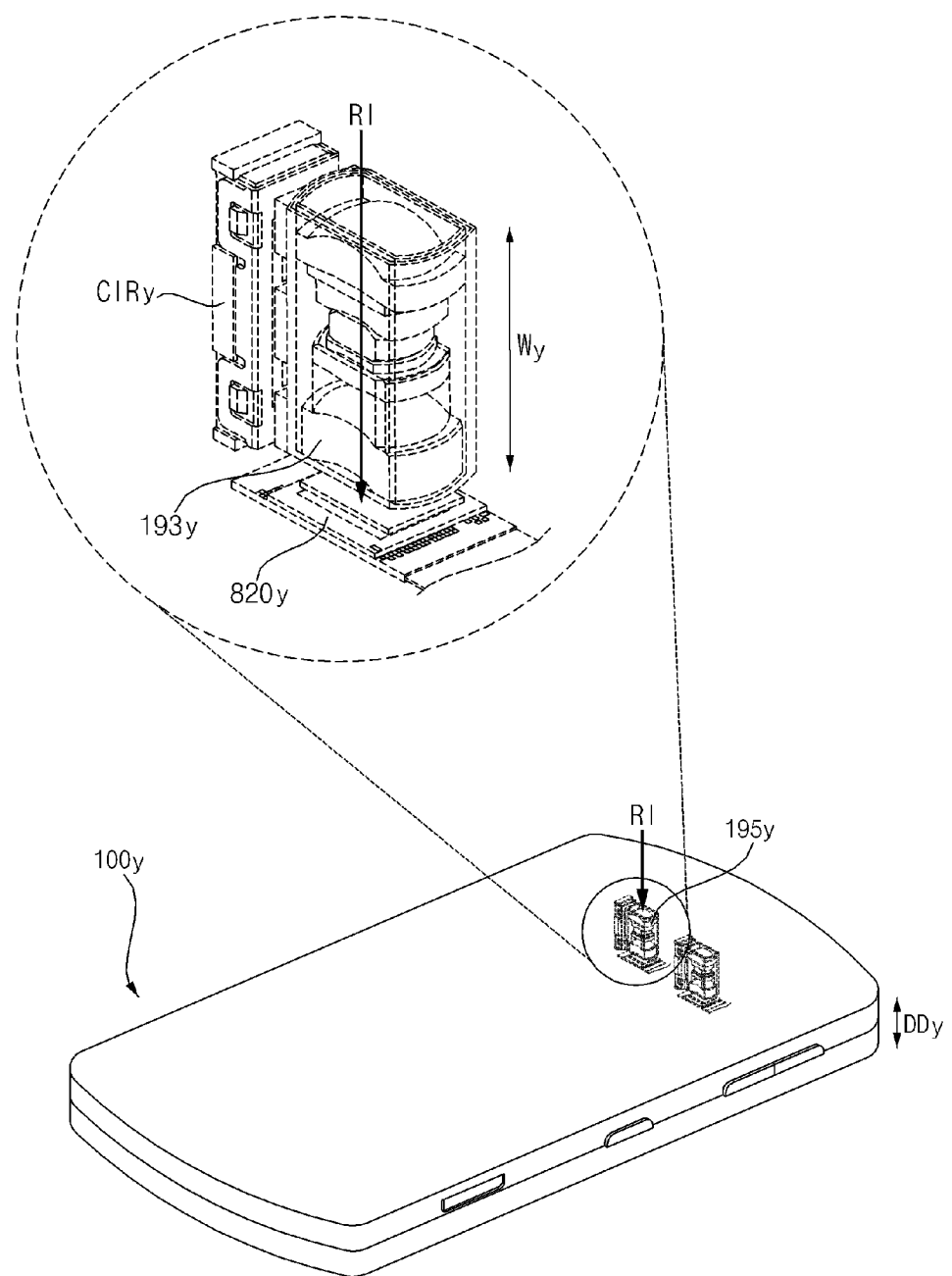

FIG. 4B and FIG. 4C are diagrams illustrating a camera in which a dual prism apparatus is omitted.

Referring to the drawing, a camera 195y of FIG. 4B may include an image sensor 820y, a lens apparatus 193y for transmitting light to the image sensor, and a lens driving unit (CIRy) for moving a lens inside the lens apparatus 193y.

Meanwhile, since the camera 195y of FIG. 4B does not have a plurality of prism structures, input light RI may be directly inputted through the lens apparatus 193y, so that the lens apparatus 193y and the image sensor 820y should be disposed perpendicular to the input light RI.

That is, in a mobile terminal 100y of FIG. 4C, input light RI may be transmitted to the image sensor 820y via the lens apparatus 193y.

Recently, the length Wy of the lens apparatus 193y increases according to the trend of high definition and high performance. According to this structure, there is a disadvantage that, as the length Wy of the lens apparatus 193y increases, the thickness DDy of the mobile terminal 100y becomes larger.

Accordingly, in order to solve this problem, in the present invention, a dual prism may be employed, and the first prism and the second prism may be disposed to intersect with each other so that the light path of the first prism and the light path of the second prism are different. According to this structure, it is possible to implement an L-type camera, and thus a slim camera having a reduced thickness can be implemented. This will be described with reference to FIG. 7.

Meanwhile, the present invention proposes a camera structure in which a single image sensor can be used with respect to a plurality of cameras at the time of a front photographing or a rear photographing in order to implement a slim camera. This will be described with reference to FIG. 5A.

Figure 5A:
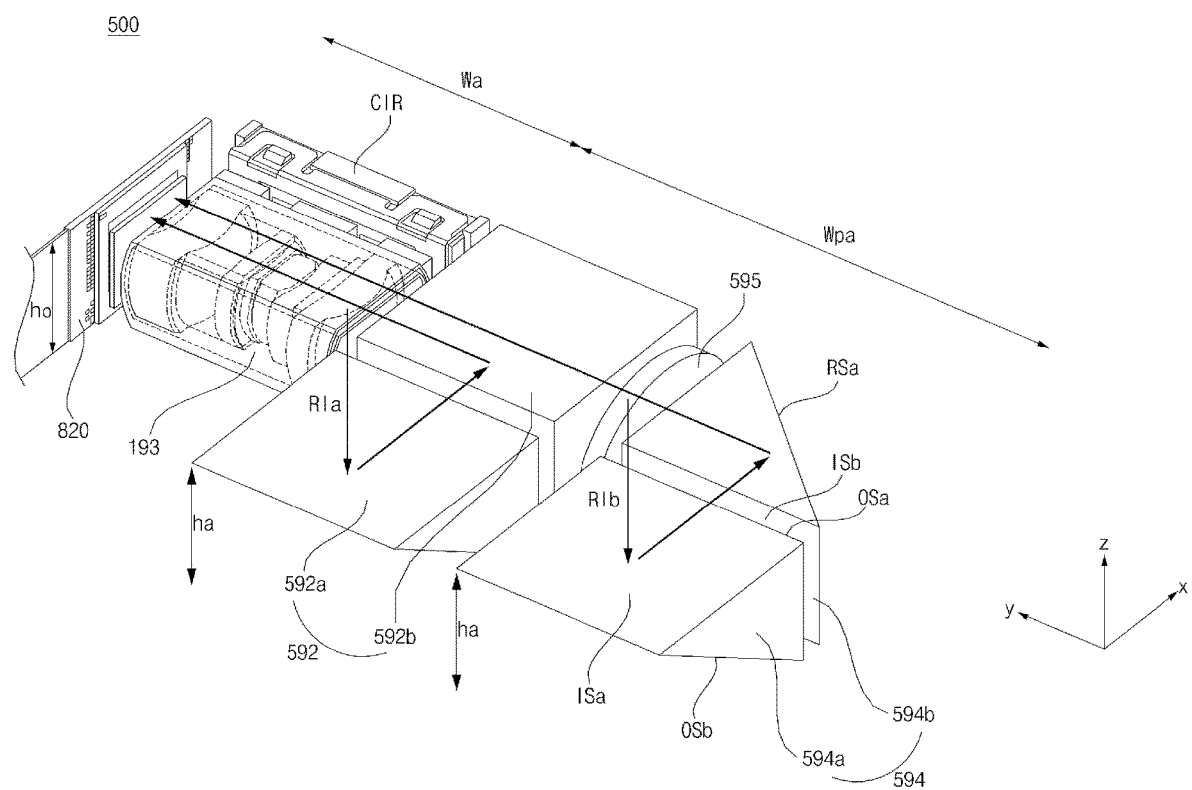
FIG. 5A is a diagram illustrating an example of a camera having a first prism apparatus and a second prism apparatus according to an embodiment of the present invention.
Figure 5B:
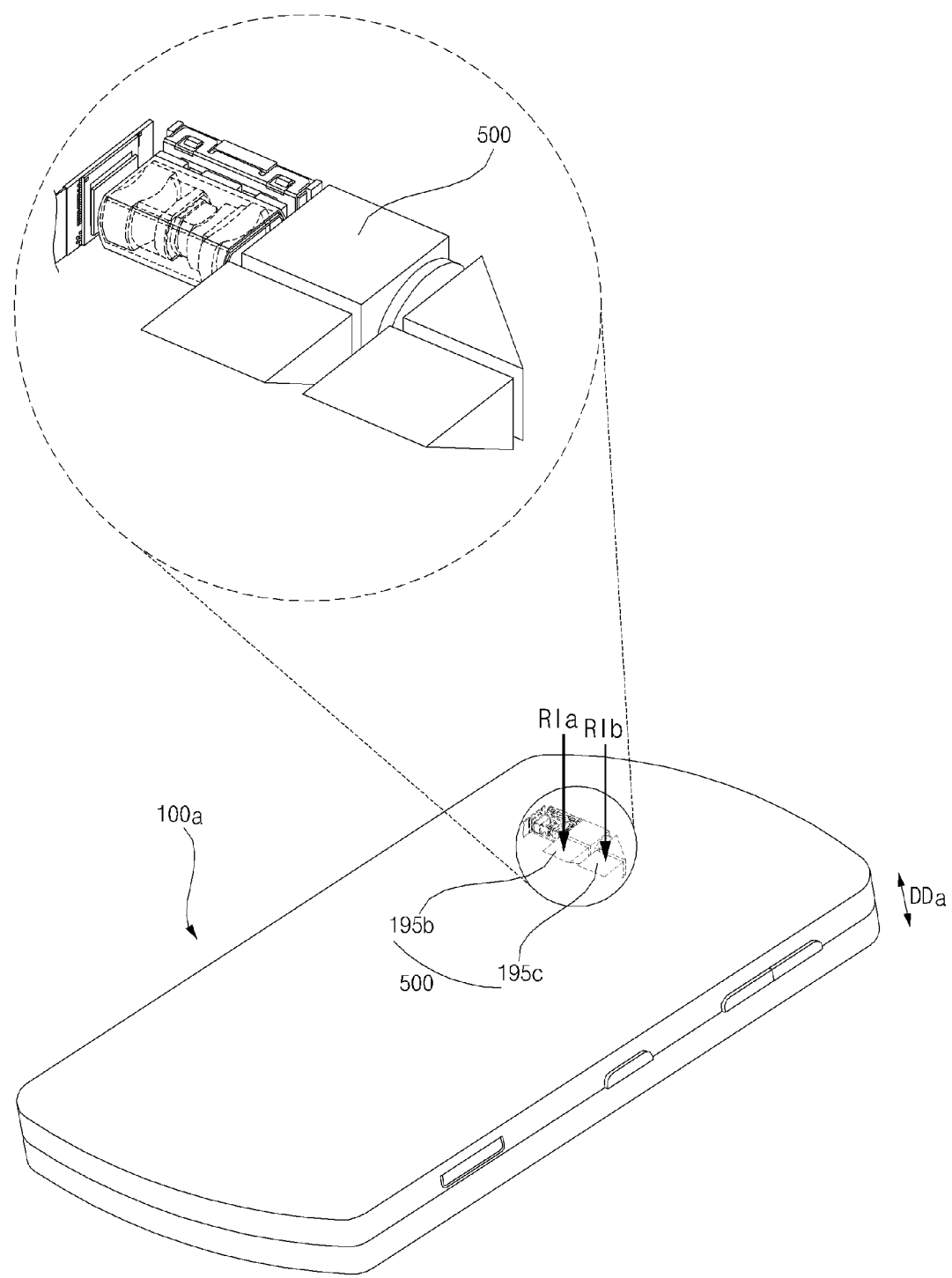
FIG. 5B is a diagram illustrating a mobile terminal having the camera of FIG. 5A.

FIG. 5A is a diagram illustrating an example of a camera having a first prism apparatus and a second prism apparatus according to an embodiment of the present invention, and FIG. 5B is a diagram illustrating a mobile terminal having the camera of FIG. 5A. In particular, a camera using a single image sensor with respect to a plurality of cameras at the time of the rear photographing is exemplified.

Referring to the drawing, a camera 500 of FIG. 5A may include a first prism apparatus 592, a second prism apparatus 594, a lens apparatus 193, and an image sensor 820.

Meanwhile, the first prism apparatus 592 and the second prism apparatus 594 may be referred to as a dual prism apparatus, as a single module.

The first prism apparatus 592 may reflect a first input light Ria input in a first direction (-z direction) to a second direction (y direction).

To this end, the first prism apparatus 592 may include a first prism 592a that reflects the first input light Ria input in the first direction (-z direction), and a second prism 592b that reflects the first input light Ria from the first prism 592a and transmits the second input light Rib from the second prism apparatus 594.

Meanwhile, the second prism apparatus 594 may reflect the second input light Rib input in the first direction (-z direction) to the second direction (y direction), and output the reflected light to the first prism apparatus 592.

To this end, the second prism apparatus 594 may include a third prism 594a that reflects a second input light Rib input in the first direction (-z direction), and a fourth prism 594b that reflects the second input light Rib from the third prism 594a and outputs the reflected second input light Rib in the second direction (y direction).

Meanwhile, the lens apparatus 193 may receive the first input light Ria from the first prism apparatus 592 or the second input light Rib from the second prism apparatus 594, and may be provided with a plurality of lenses adjusted for variable focus.

The image sensor 820 may generate an image signal based on the first input light Ria or the second input light Rib passing through the lens apparatus 193.

Meanwhile, the first prism apparatus 592 may serve as a rear camera 195b, and the second prism apparatus 594 may serve as a rear camera 195c.

Accordingly, it is possible to implement the slim camera 500 that can use a single image sensor 820 with respect to a plurality of cameras at the time of the rear photographing.

Meanwhile, the image sensor 820 may generate a first image signal based on the first input light Ria passing through the lens apparatus 193 in a first period, and generate a second image signal based on the second input light Rib passing through the lens apparatus 193 in a second period after the first period. Accordingly, it is possible to implement the slim camera 500 that can use a single image sensor 820 with respect to a plurality of cameras at the time of the rear photographing in a different period.

Meanwhile, the resolution of the first image based on the first image signal is higher than the resolution of the second image based on the second image signal. Accordingly, it is possible to acquire images of different resolutions with respect to a plurality of cameras at the time of photographing.

Meanwhile, in the lens apparatus 193, the movement of the lens in the lens apparatus 193 during the first period is different from the movement of the lens in the lens apparatus 193 during the second period. Accordingly, images of different magnifications can be acquired at the time of photographing.

Meanwhile, the camera 500 may further include a lens 595 disposed between the first prism apparatus 592 and the second prism apparatus 594. Accordingly, images of different magnifications can be acquired at the time of photographing.

Meanwhile, FIG. 5A illustrates that the length of the lens apparatus 193 is denoted by Wa, the length of the first prism apparatus 592 and the second prism apparatus 594 is denoted by Wpa, and the height of the lens apparatus 193, the first prism apparatus 592, and the second prism apparatus 594 is denoted by ha.

Meanwhile, the camera 500 of FIG. 5A may include a third camera 195b and a fourth camera 195c, as a rear stereo camera.

Meanwhile, FIG. 5B illustrates the mobile terminal 100a equipped with the camera 500 of FIG. 5A. Referring to FIG. 5B, the first input light Ria input on the first prism apparatus 592 may be inputted through the rear surface of the mobile terminal 100a, and the second input light Rib input on the second prism apparatus 594 may be inputted through the rear surface of the mobile terminal 100a.

Therefore, the thickness DDa of the mobile terminal 100a may be determined not by the sum (Wa+Wpa) of the lengths of the lens apparatus 193, the first prism apparatus 592, and the second prism apparatus 594, but by the height ha of the lens apparatus 193, the first prism apparatus 592, and the second prism apparatus 594, or the height ho of the image sensor.

Accordingly, as the height ha of the lens apparatus 193, the first prism apparatus 592, and the second prism apparatus 594, or the height ho of the image sensor is designed to be low, the thickness DDa of the mobile terminal 100a can be slimly implemented. Accordingly, the slim camera 500 having a thin thickness and the mobile terminal 100 having the slim camera 500 can be implemented.

Further, by using a single image sensor with respect to a plurality of cameras 195b and 195c at the time of rear photographing, the manufacturing cost and the like can be reduced.

Figure 6A:
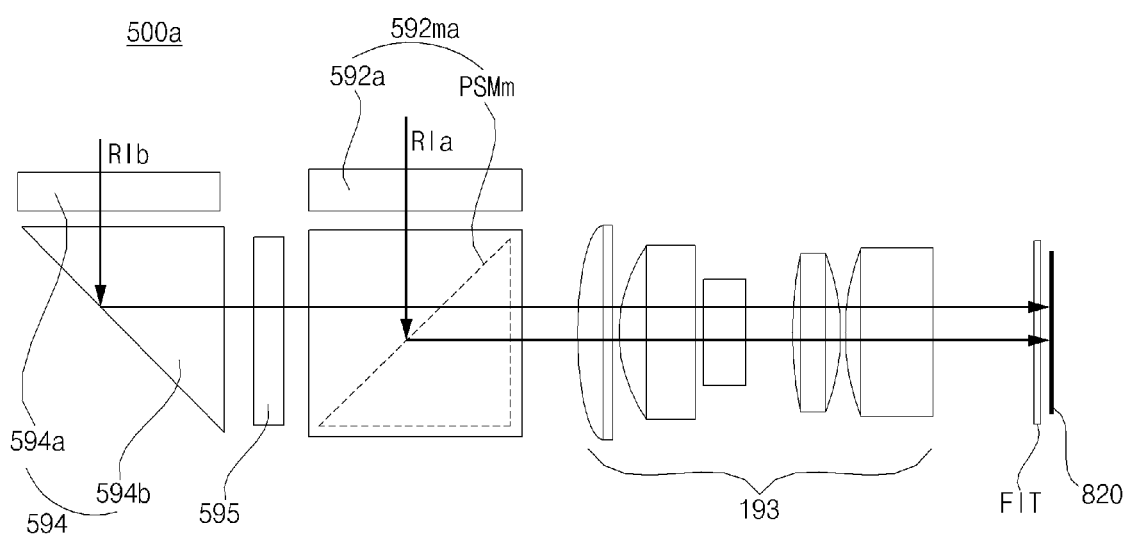
FIG. 6A to FIG. 6C are diagrams illustrating various examples of the first prism apparatus of FIG. 5A.
Figure 6B:
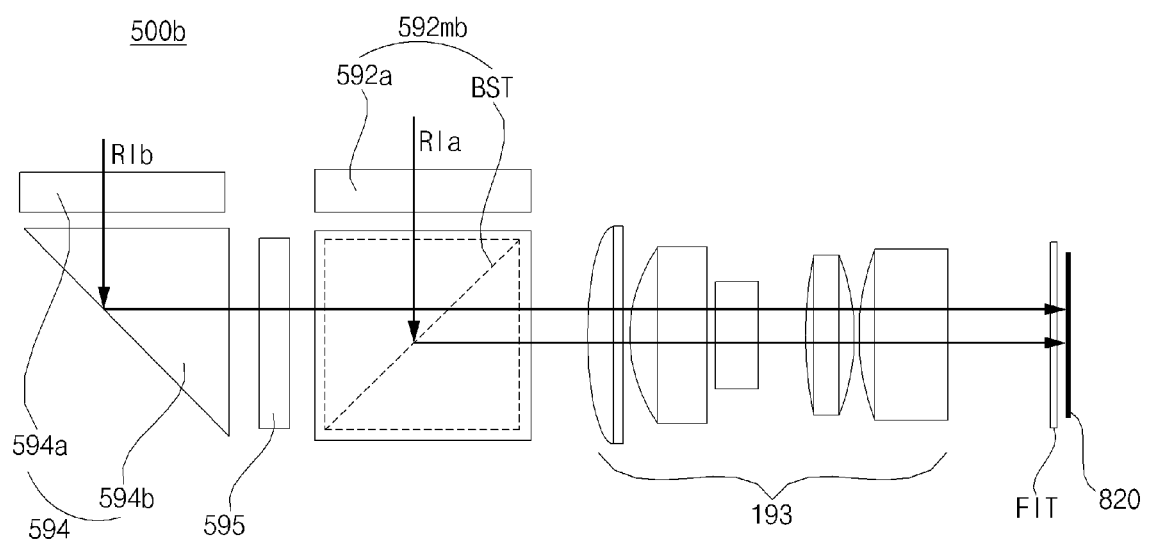
Figure 6C:
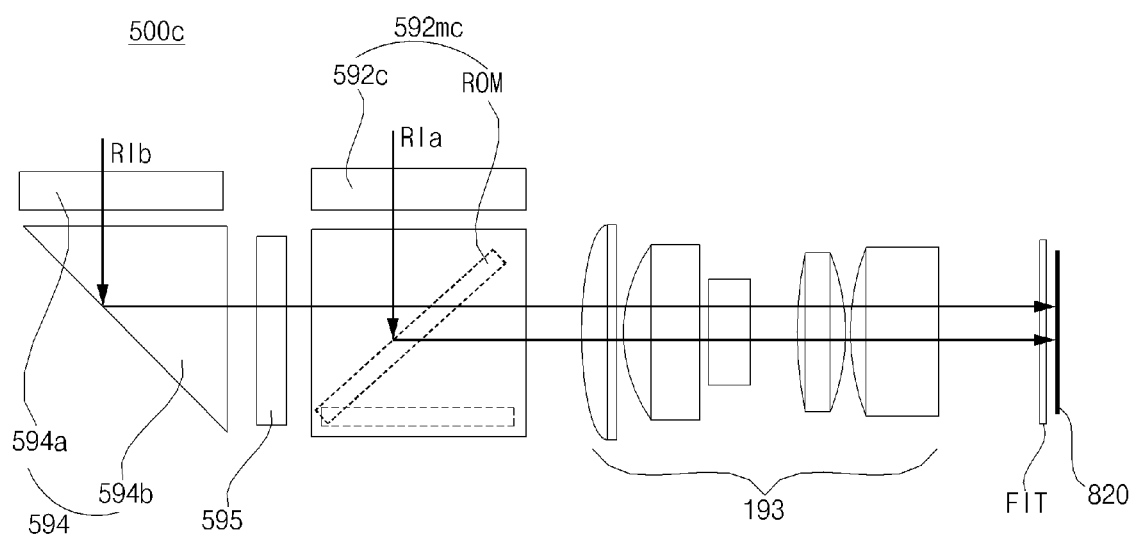

FIG. 6A to FIG. 6C are diagrams illustrating various examples of the first prism apparatus of FIG. 5A.

FIG. 6A to FIG. 6C illustrate various cameras 500a to 500c equipped with a first prism apparatus, a second prism apparatus 594, a lens 595, a lens apparatus 193, a filter FIT, an image sensor 820.

In particular, the cameras of FIGS. 6A to 6C may be a rear stereo camera, and the first input light Ria and the second input light Rib are inputted from the rear direction.

First, in the camera 500a of FIG. 6A, the second prism apparatus 594 includes a third prism 594a and a fourth prism 594b, and the first prism apparatus 592ma includes the first prism 592a, and a second prism PSMm.

The first prism 592a may reflect the first input light Ria input in the first direction (-z direction), and the second prism PSMm may reflect the first input light Ria from the first prism PSMa, and may transmit the second input light Rib from the second prism apparatus 594. Accordingly, it is possible to implement a slim camera 500 that can use a single image sensor 820 with respect to a plurality of cameras at the time of rear photographing.

Next, in the camera 500b of FIG. 6B, the second prism apparatus 594 includes a third prism 594a and a fourth prism 594b, and the first prism apparatus 592mb includes a first prism 592a and a beam splitter BST.

The first prism 592a may reflect the first input light Ria input in the first direction (-z direction), and the beam splitter BST may reflect the first input light Ria from the first prism PSMa and may transmit the second input light Rib from the second prism apparatus 594. Accordingly, it is possible to implement a slim camera 500 that can use a single image sensor 820 with respect to a plurality of cameras at the time of the rear photographing.

Next, in the camera 500c of FIG. 6C, the second prism apparatus 594 includes a third prism 594a and a fourth prism 594b, and the first prism apparatus 592mc includes a first prism 592a, and a rotating mirror (ROM).

The first prism 592a may reflect the first input light Ria input in the first direction (-z direction), and the rotating mirror ROM may rotate by a certain angle so as to reflect the first input light Ria from the first prism PSMa in the first period, and may stop to transmit the second input light Rib from the second prism apparatus 594 in the second period. Accordingly, it is possible to implement the slim camera 500 that can use a single image sensor 820 with respect to a plurality of cameras at the time of the rear photographing.

Figure 7:
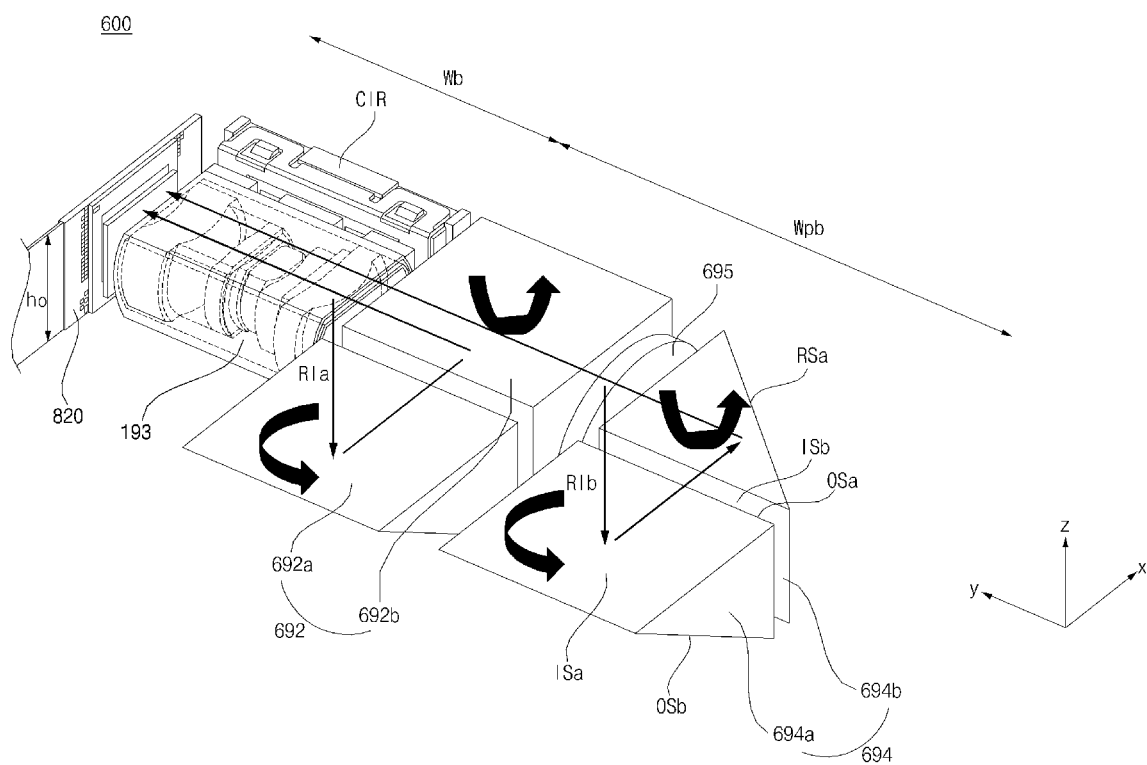
FIG. 7 is a diagram illustrating an example of a camera having a first prism apparatus and a second prism apparatus according to another embodiment of the present invention.

FIG. 7 is a diagram illustrating an example of a camera having a first prism apparatus and a second prism apparatus according to another embodiment of the present invention.

Referring to drawing, a camera 600 of FIG. 7 may include a first prism apparatus 692, a second prism apparatus 694, a lens apparatus 193, and an image sensor 820.

Meanwhile, the first prism apparatus 692 and the second prism apparatus 694 may be referred to as a dual prism apparatus as a single module.

The first prism apparatus 692 may reflect the first input light Ria input in the first direction (-z direction) to the second direction (y direction).

To this end, the first prism apparatus 692 may include a first prism module 692a that reflects the first input light Ria input in the first direction (-z direction), and a second prism module 692b that reflects the first input light Ria from the first prism module 692a and transmits the second input light Rib from the second prism apparatus 694.

Meanwhile, the second prism apparatus 694 may reflect the second input light Rib input in the first direction (-z direction) to the second direction (y direction), and output to the first prism apparatus 692.

To this end, the second prism apparatus 694 may include a third prism module 694a that reflects the second input light Rib input in the first direction (-z direction), and a fourth prism module 694b that reflects the second input light Rib from the third prism module 694a and outputs the reflected second input light Rib in the second direction (y direction).

Meanwhile, the lens apparatus 193 may receive the first input light Ria emitted from the first prism apparatus 692 or the second input light Rib emitted from the second prism apparatus 694, and may be provided with a plurality of lenses adjusted for variable focus.

The image sensor 820 may generate an image signal based on the first input light Ria or the second input light Rib passing through the lens apparatus 193.

Meanwhile, the first prism apparatus 692 may serve as a rear camera 195b, and the second prism apparatus 694 may serve as a rear camera 195c.

Accordingly, it is possible to implement a slim camera 600 that can use a single image sensor 820 with respect to a plurality of cameras at the time of the rear photographing.

Meanwhile, the image sensor 820 may generate a first image signal based on the first input light Ria passing through the lens apparatus 193 in a first period, and generate a second image signal based on the second input light Rib passing through the lens apparatus 193 in a second period after the first period. Accordingly, it is possible to implement the slim camera 600 that can use the single image sensor 820 with respect to a plurality of cameras at the time of the rear photographing, in a different period.

Meanwhile, the resolution of the first image based on the first image signal is higher than the resolution of the second image based on the second image signal. Accordingly, it is possible to acquire images of different resolutions with respect to a plurality of cameras at the time of photographing.

Meanwhile, in the lens apparatus 193, the movement of the lens in the lens apparatus 193 during the first period is different from the movement of the lens in the lens apparatus 193 during the second period. Accordingly, images of different magnifications can be acquired with respect to a plurality of cameras at the time of photographing.

Meanwhile, the camera 600 may further include a lens 695 disposed between the first prism apparatus 692 and the second prism apparatus 694. Accordingly, images of different magnifications can be acquired with respect to a plurality of cameras at the time of photographing.

Meanwhile, the camera 600 of FIG. 7 is similar to the camera 500 of FIG. 5A, but has a difference in that an angle compensation for the optical image stabilization (OIS) is performed with respect to the first prism apparatus 692 or the second prism apparatus 694.

For example, the first prism module 692a and the second prism module 692b in the first prism apparatus 692 may rotate on different axes, respectively, due to hand tremor, and an optical image stabilization (OIS) for the compensation of the hand tremor may be performed for each of the first prism module 692a and the second prism module 692b.

As another example, the third prism module 694a and the fourth prism module 694b in the second prism apparatus 694 may rotate on different axes, respectively, due to hand tremor, and an optical image stabilization (OIS) for the compensation of the hand tremor may be performed for each of the third prism module 694a and the fourth prism module 694b.

Hereinafter, an angle compensation scheme for the optical image stabilization (OIS) of the first prism apparatus 692 is described, but the present invention is not limited thereto.

The angle compensation for the optical image stabilization (OIS) of the second prism apparatus 694 also can be achieved.

Figure 8A:
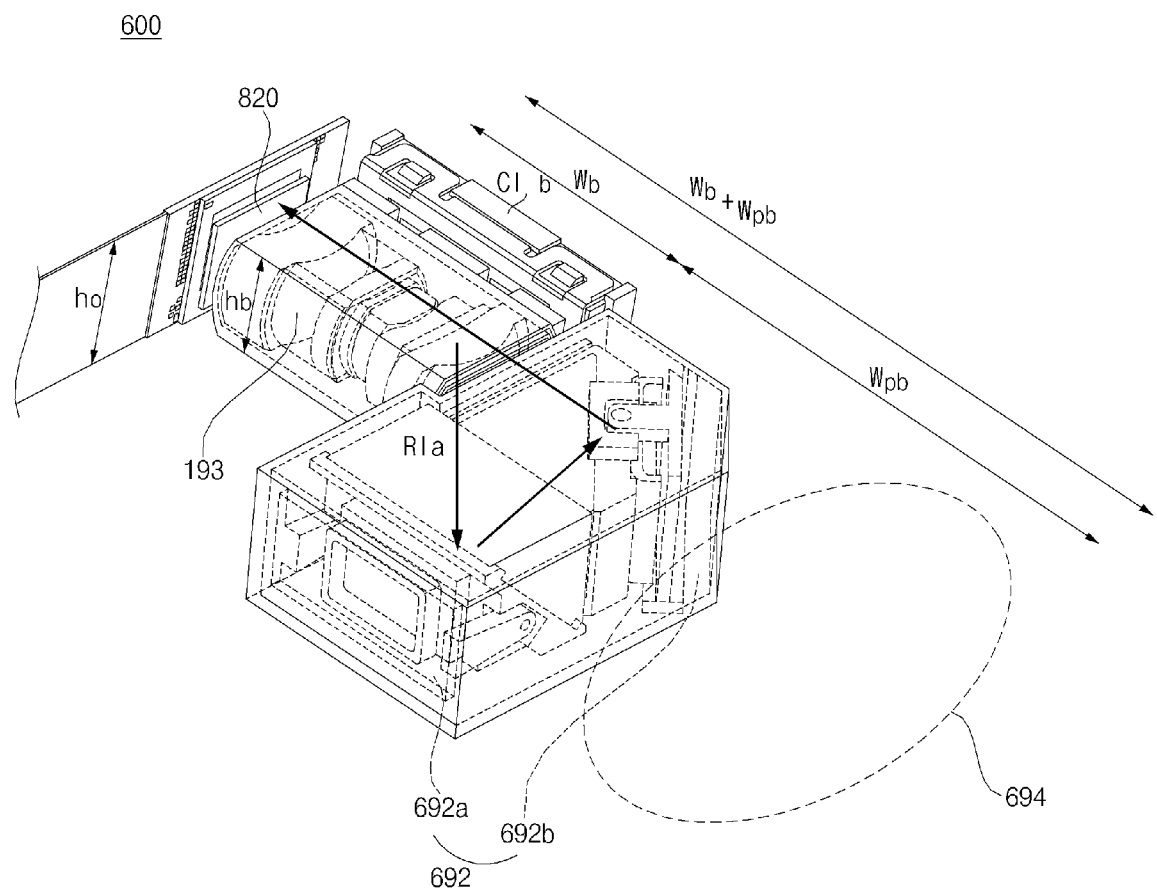
FIG. 8A and FIG. 8B are diagrams for explaining FIG. 7.
Figure 8B:
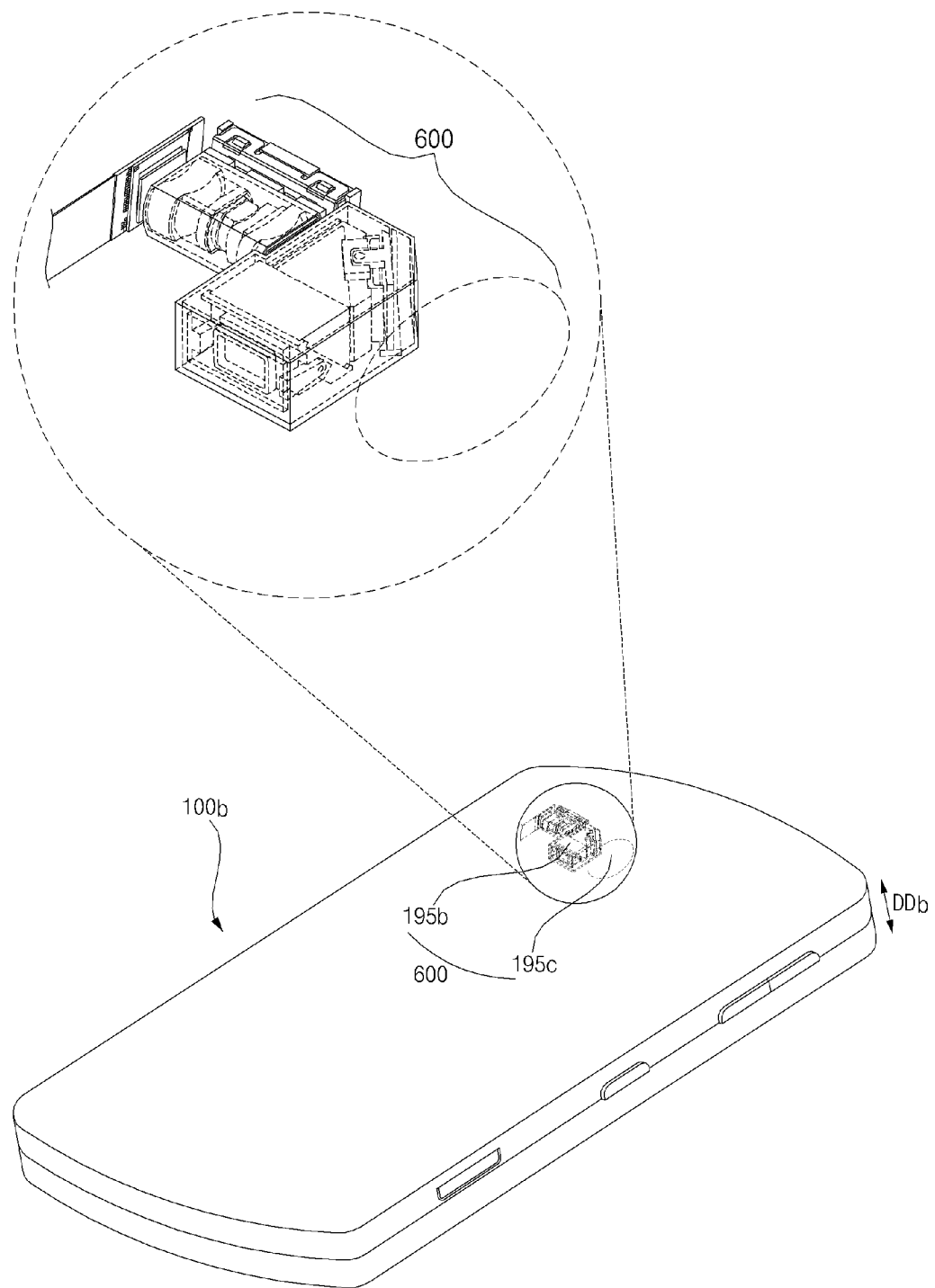

FIG. 8A and FIG. 8B are diagrams for explaining FIG. 7, and FIG. 9 to FIG. 12C are diagrams for explaining a camera of FIG. 8A.

Referring to the drawing, a camera 600 of FIG. 8A may include an image sensor 820, a lens apparatus 193 for transmitting light to the image sensor 820, a first prism apparatus 692 having a first prism module 692a and a second prism module 692b.

The camera 600 of FIG. 8A is similar to the camera 500 of FIG. 5A, but has a difference in that the first prism module 692a and the second prism module 692b in the first prism apparatus 692 are differently disposed. In this case, the difference is mainly described.

In the drawing, it is illustrated that the image sensor 820, the lens apparatus 193, and the first prism apparatus 692 are sequentially disposed, and the first input light Ria input to the first prism apparatus 692 is transmitted to the lens apparatus 193 and the image sensor 820.

Specifically, the first input light Ria from the above may be reflected by a reflection surface of the first prism PSMa in the first prism module 692a and may be transmitted to the second prism module 692b, and may be reflected by a reflection surface of the second prism PSMb in the second prism module 692b and may be transmitted to the lens apparatus 193 and the image sensor 820.

That is, unlike FIG. 5A, there is a difference in that the first prism module 692a in the first prism apparatus 692 of FIG. 8A is disposed in a forward direction in comparison with the second prism module 692b. Accordingly, the light reflected by the prism module PSMa in the first prism module 692a may travel in the ground direction or the right direction.

That is, unlike FIG. 8A, the image sensor 820, the first prism apparatus 692, and the lens apparatus 193 may be sequentially disposed, and the light input on the lens apparatus 193 may be transmitted to the first prism apparatus 692 and the image sensor 820. Hereinafter, the structure of FIG. 8A will be mainly described.

The first prism apparatus 692 may include a first prism PSMa configured to reflect input light toward a first reflected direction, a first actuator ACTa configured to change an angle of the first prism PSMa about a first rotation axis Axma to change the first reflected direction based on a first control signal Saca that is inputted, a second prism PSMb configured to reflect the light reflected from the first prism PSMa toward a second reflected direction, and a second actuator ACTb configured to change an angle of the second prism PSMb about a second rotation axis Axmb to change the second reflected direction based on a second control signal Sacb that is inputted.

The first prism PSMa may include a first second internal reflective surface RSa, and the second prism PSMb may include a second second internal reflective surface RSb.

The first prism PSMa may receive the input light through a first entry prism surface ISa and output the input light reflected from the first internal reflective surface RSa through a first exit prism surface OSa, and the second prism PSMb may receive the reflected light through a second entry prism surface ISb and output the reflected light reflected from the second internal reflective surface RSb through a second exit prism surface OSb.

The first exit prism surface OSa of the first prism PSMa faces the second entry prism surface ISb of the second prism PSMb.

The first rotation axis Axma of the first prism PSMa may be perpendicular to the second rotation axis Axmb of the second prism PSMb.

At this time, it is preferable that the first prism PSMa and the second prism PSMb intersect with each other. In particular, it is preferable that the first prism PSMa and the second prism PSMb are disposed perpendicular to each other.

Meanwhile, the refractive indices of the first prism PSMa and the second prism PSMb may be 1.7 or more. Accordingly, a total reflection may be performed in the first prism PSMa and the second prism PSMb, and thus, the light RI can be transmitted in the direction of the image sensor.

Meanwhile, the refractive indices of the first prism PSMa and the second prism PSMb may be less than 1.7, and a reflective coating may be formed on a reflective surface of the first prism PSMa and the second prism PSMb. Accordingly, a total reflection can be performed in the first prism PSMa and the second prism PSMb, and thus, the light RI can be transmitted in the direction of the image sensor.

According to this, the image sensor 820, the lens apparatus 193, and the first prism module 692a may be disposed side by side in one direction, while the second prism module 692b is disposed to intersect with the first prism module 692a.

Accordingly, the first prism module 692a and the second prism module 692b may be referred to as an L-type first prism apparatus 692. In addition, the camera 600 having this structure may be referred to as an L-type camera.

According to this structure, through the first prism module 692a and the second prism module 692b, a rotation may occur in a first direction, e.g., in a counterclockwise direction CCW based on a first rotation axis Axa, and a rotation may occur in a second direction, e.g., in a counterclockwise direction CCW based on a second rotation axis Axb, so that the angle compensation may be performed, thereby achieving the optical image stabilization (OIS) function.

In particular, since angular compensation is performed by using a rotary actuator, there is an advantage that it is enough to compensate only an angle within a given range, regardless of whether the optical zoom of the lens apparatus 193 is a low magnification or a high magnification. Hence, regardless of the optical zoom, the accuracy of optical image stabilization (OIS) can be improved.

In addition, since an optimal space arrangement can be accomplished in a limited space, a slim camera 600 can be implemented. Therefore, the present invention can be applied to the mobile terminal 100, and the like.

FIG. 8A illustrates that the length of the lens apparatus 193 is denoted by Wb and the length of the first prism apparatus 692 and the second prism apparatus 694 is denoted by Wpb, and the height of the lens apparatus 693 and the dual prism apparatus including the first prism apparatus 692 and the second prism apparatus 694 is denoted by hb.

Since the first prism module 692a and the second prism module 692b in the first prism apparatus 692 are disposed to intersect with each other, as shown in the mobile terminal 100b of FIG. 8B, the movement direction of the input light Ria may be changed twice through the first prism module 692a and the second prism module 692b, and the image sensor 820 may be disposed in the left side of the mobile terminal 100b. In particular, the image sensor 820 may be disposed to face the lateral side of the mobile terminal 100b.

Therefore, the thickness DDb of the mobile terminal 100y may be determined not by the sum (Wb+Wpb) of the lengths of the lens apparatus 193, the first prism apparatus 692, and the second prism apparatus 694, but by the heights hb of the lens apparatus 193 and the first prism apparatus 692 or the second prism apparatus 694 or the height ho of the image sensor 820.

Accordingly, as the heights hb of the lens apparatus 193 or the first prism apparatus 692 or the second prism apparatus 694 or the height ho of the image sensor 820 is designed to be low, the thickness DDb of the mobile terminal 100y can be slimly implemented. Accordingly, the slim camera 600 having a thin thickness and a mobile terminal 100b having the slim camera 600 can be implemented.

Figure 9:
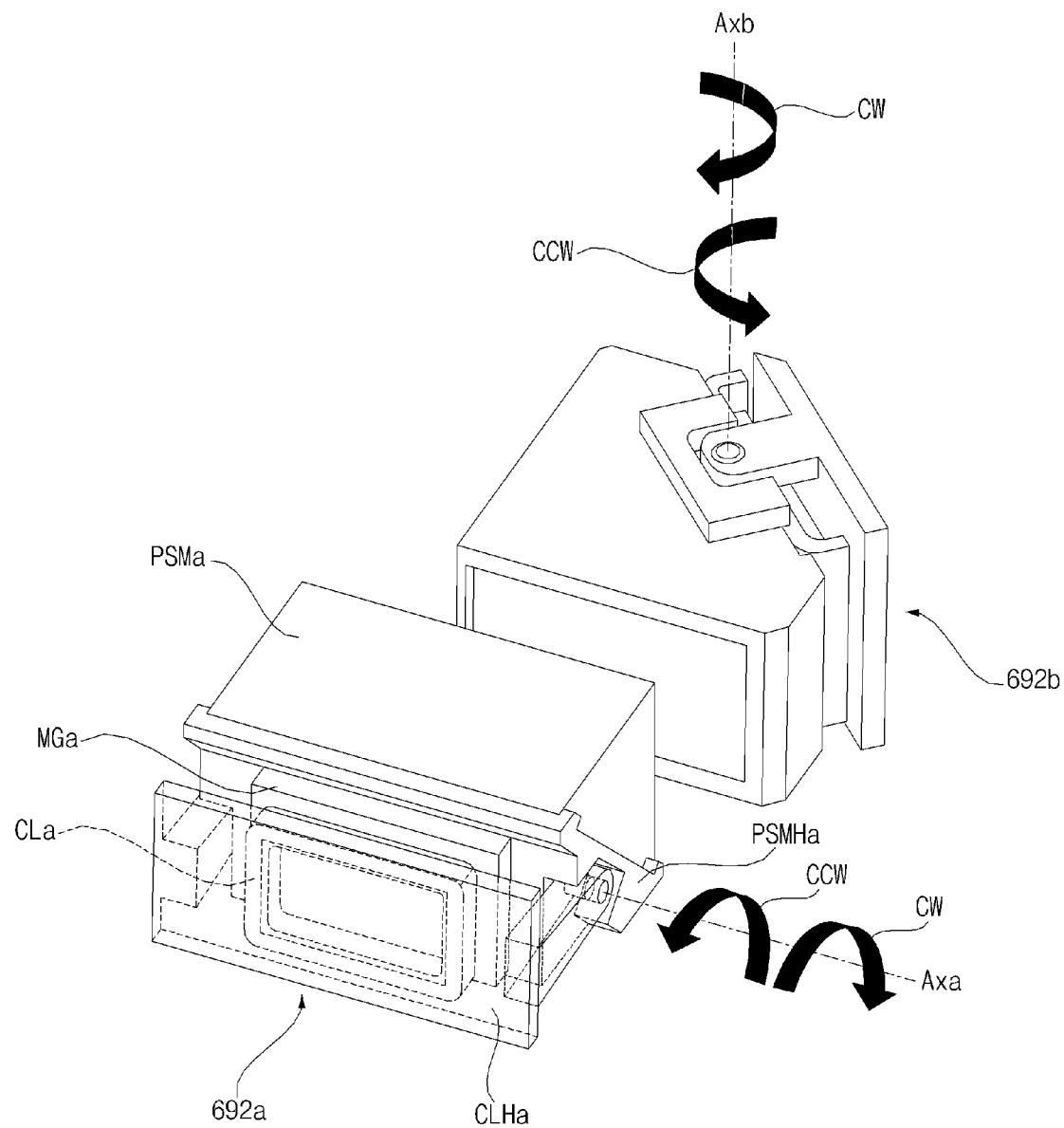
FIG. 9 to FIG. 11C are diagrams for explaining a camera of FIG. 8A.
Figure 10:
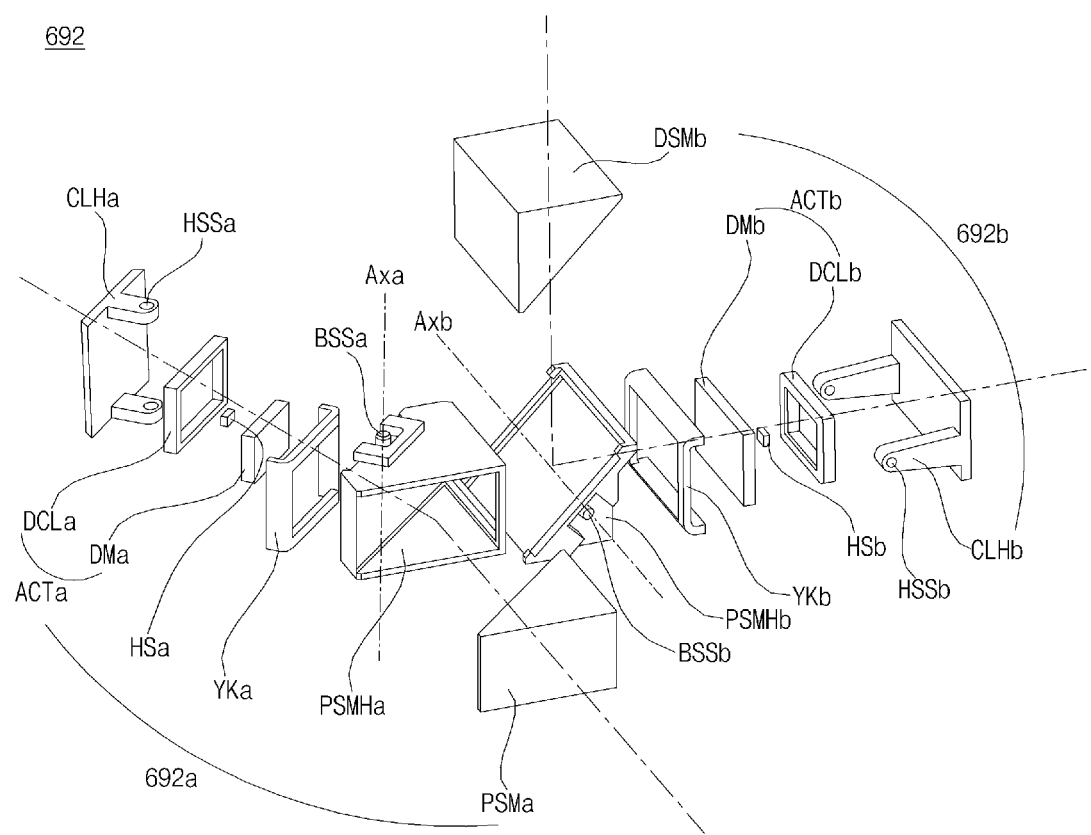

Meanwhile, referring to FIGS. 9 and 10, the first prism apparatus 692 may include the first prism module 692a and the second prism module 692b.

The first prism module 692a may include the first prism PSMa, a first prism holder PSMHa configured to secure the first prism PSMa, a first yoke Yka coupled to a rear of the first prism holder PSMHa, a first drive magnet DMa coupled to a rear of the first yoke Yka, a first coil holder CLHa including a plurality of protrusions protruding toward the first prism holder PSMHa, each of the plurality of protrusions includes an opening HSSa, and the openings HSSa define the first rotation axis Axa.

The first drive coil DCLa may be disposed between the first coil holder CLHa and the first yoke Yka, the first prism holder PSMHa may include a plurality of bosses BSSa coupled with the openings of the plurality of protrusions so as to rotate the first prism PSMa about the first rotation axis Axa.

Meanwhile, the drive magnet DMa and the drive coil DCLa in the first prism module 692a may constitute a first rotary actuator ACTa.

For example, in order to compensate the first direction motion among the first direction motion and the second direction motion sensed by the motion sensor 145, particularly, the gyro sensor 145c, shown in FIG. 3C or FIG. 3D, the drive controller DRC may output the first control signal Saca to the first actuator ACTa in the first prism module 692a.

The first actuator ACTa may change the angle of the first prism PSMa based on the first rotation axis, based on the first control signal Saca.

In particular, based on the first control signal Saca applied to the drive coil DCLa in the first actuator ACTb, the angle of the first prism PSMa can be changed based on the first rotation axis.

Meanwhile, the first hall effect sensor HSa may sense a change in the magnetic field in order to check motion information due to the movement of the first prism PSMa. Specially, the first hall effect sensor HSa may sense an angle change of the first prism PSMa based on a first magnetic field.

In addition, the motion information, particularly, the magnetic field change information Shsa, sensed by the first hall effect sensor HSa may be inputted to the drive controller DRC.

The drive controller DRC may perform a PI control or the like, based on the control signal Saca for motion compensation and the motion information, in particular, the magnetic field change information Shsa. Accordingly, the motion of the first prism PSMa can be accurately controlled.

That is, the drive controller DRC may perform a closed loop by receiving the information Shsa sensed by the first hall effect sensor HSa, and can accurately control the motion of the first prism PSMa.

Accordingly, the first drive magnet DMa, the first prism holder PSMHa, and the first prism PSMa may be rotated based on the first rotation axis Axa.

Meanwhile, the first coil holder CLHa, the first drive coil DCLa, and the first hall effect sensor HSa may be fixed without being rotated based on the first rotation axis Axa.

As described above, some units in the first prism module 692a may rotate and some units may be fixed, thereby sensing the hand tremor based on a magnetic field signal sensed in the first hall effect sensor HSa. In order to perform optical image stabilization (OIS), the first drive magnet DMa may rotate so that the first prism PSMa or the like can be rotated. Thus, the optical image stabilization (OIS) for the first direction can be accurately performed.

Meanwhile, referring to FIG. 10, the second prism module 692b may include the second prism PSMb, a second prism holder PSMHb configured to secure the second prism PSMb, a second yoke Ykb coupled to a rear of the second prism holder PSMHb, a second drive magnet DMb coupled to a rear of the second yoke Ykb, a second coil holder CLHb including a plurality of protrusions protruding toward the second prism holder PSMHb, each of the plurality of protrusions includes an opening HSSa, and the openings HSSa define the second rotation axis Axb.

The second drive coil DCLb may be disposed between the second coil holder CLHb and the second yoke Ykb, and the second prism holder PSMHb may include a plurality of bosses BSSb coupled with the openings of the plurality of protrusions so as to rotate the second prism PSMb about the second rotation axis Axb.

Meanwhile, the second drive magnet DMb and the second drive coil DCLb in the second prism module 692b may constitute a second rotary actuator ACTb.

For example, in order to compensate the second direction motion among the first direction motion and the second direction motion sensed by the motion sensor 145, particularly, the gyro sensor 145c, shown in FIG. 3C or FIG. 3D, the drive controller DRC may output the second control signal Sacb to the second actuator ACTb in the second prism module 692b.

The second actuator ACTb may change the angle of the second prism PSMb based on the second rotation axis, based on the second control signal Sacb.

In particular, based on the second control signal Sacb applied to the drive coil DCLb in the second actuator ACTb, the angle of the second prism PSMb can be changed based on the second rotation axis.

Meanwhile, the second hall effect sensor HSb may sense a change in the magnetic field in order to check motion information due to the movement of the second prism PSMb. Specially, a second hall effect sensor HSb may sense an angle change of the second prism PSMb based on a second magnetic field.

In addition, the motion information, particularly, the magnetic field change information Shsb, sensed by the second hall effect sensor HSb may be inputted to the drive controller DRC.

The drive controller DRC may perform a PI control or the like, based on the control signal Sacb for motion compensation and the motion information, in particular, the magnetic field change information Shsb. Accordingly, the motion of the second prism PSMb can be accurately controlled.

That is, the drive controller DRC may perform a closed loop by receiving the information Shsb sensed by the second hall effect sensor HSb, and can accurately control the motion of the second prism PSMb.

Accordingly, the second drive magnet DMb, the second prism holder PSMHb, and the second prism PSMb may be rotated based on the second rotation axis Axb.

Meanwhile, the second coil holder CLHb, the second drive coil DCLb, and the second hall effect sensor HSb may be fixed without being rotated based on the second rotation axis Axb.

As described above, some units in the second prism module 692b may rotate and some units may be fixed, thereby sensing the hand tremor based on a magnetic field signal sensed in the second hall effect sensor HSb. In order to perform optical image stabilization (OIS), the second drive magnet DMb may rotates so that the second prism PSMb or the like can be rotated. Thus, the optical image stabilization (OIS) for the second direction can be accurately performed.

For example, as shown in FIG. 9, when the first prism PSMa is rotated in the clockwise direction CW based on the first rotation axis Axa due to the user's hand tremor, the drive controller DRC may control the first prism PSMa, a first sensor magnet SMa, and the like to rotate in the counterclockwise direction CCW based on the first rotation axis Axa, by using the first rotary actuator ACTa, particularly, the first drive magnet DMa and the first drive coil DCLa so as to perform optical image stabilization (OIS).

Particularly, when the first control signal Saca from the drive controller DRC is applied to the first drive coil DCLa in the first actuator ACTa, a Lorentz force may be generated between the first drive coil DCLa and the first drive magnet DMa, so that the first drive magnet DMa can rotate in the counterclockwise direction CCW.

At this time, the first hall effect sensor Hsa may sense a change in the magnetic field that is variable, by the counterclockwise CCW rotation of the first sensor magnet SMa.

In addition, the drive controller DRC may perform a closed loop based on the information Shsa sensed by the first hall effect sensor HSa, so that the counterclockwise CCW rotation of the first drive magnet DMa can be more accurately controlled.

For another example, as shown in FIG. 9, when the second prism PSMb is rotated in the clockwise direction CW based on the second rotation axis Axb due to the user's hand tremor, the drive controller DRC may control the second prism PSMb, a second sensor magnet SMb, and the like to rotate in the counterclockwise direction CCW based on the second rotation axis Axb, by using a second rotary actuator, particularly, the second drive magnet DMb and the second drive coil DCLb so as to perform optical image stabilization (OIS).

Particularly, when the second control signal Sacb from the drive controller DRC is applied to the second drive coil DCLb in the second actuator ACTb, a Lorentz force may be generated between the second drive coil DCLb and the second drive magnet DMb, so that the second drive magnet DMb can rotate in the counterclockwise direction CCW.

At this time, the second hall effect sensor Hsb may sense a change in the magnetic field that is variable, by the counterclockwise CCW rotation of the second sensor magnet SMb.

In addition, the drive controller DRC may perform a closed loop based on the information Shsb sensed by the second hall effect sensor HSb, so that the counterclockwise CCW rotation of the second drive magnet DMb can be more accurately controlled.

As described above, the first prism module 692a and the second prism module 692b may be independently driven respectively, based on the first rotation axis Axa and the second rotation axis Axb, depending on the hand tremor movement. Therefore, the optical image stabilization (OIS) for a plurality of directions can be performed quickly and accurately.

Meanwhile, when the first prism PSMa moves at a first angle of a first direction of the first rotation axis Axa, the first actuator ACTa may change the first prism PSMa into a second angle θ2 which is half of the first angle θ1, in a second direction opposite to the first direction of the first rotation axis Axa. According to this, motion compensation may be performed at an angle smaller than the motion of the user's hand tremor in spite of the user's hand tremor, so that accurate optical image stabilization (OIS) can be performed. In addition, the power consumption can also be reduced.

Meanwhile, when the second prism PSMb moves at a third angle θ3 in a third direction of the second rotation axis Axb, the second actuator ACTb may change the second prism PSMb into a fourth angle θ4 which is half of the third angle θ3, in a fourth direction opposite to the third direction of the second rotation axis Axb. According to this, motion compensation may be performed at an angle smaller than the motion of the user's hand tremor in spite of the user's hand tremor, so that accurate optical image stabilization (OIS) can be performed. In addition, the power consumption can also be reduced. This will be described with reference to FIGS. 11A to 11C below.

Figure 11A:
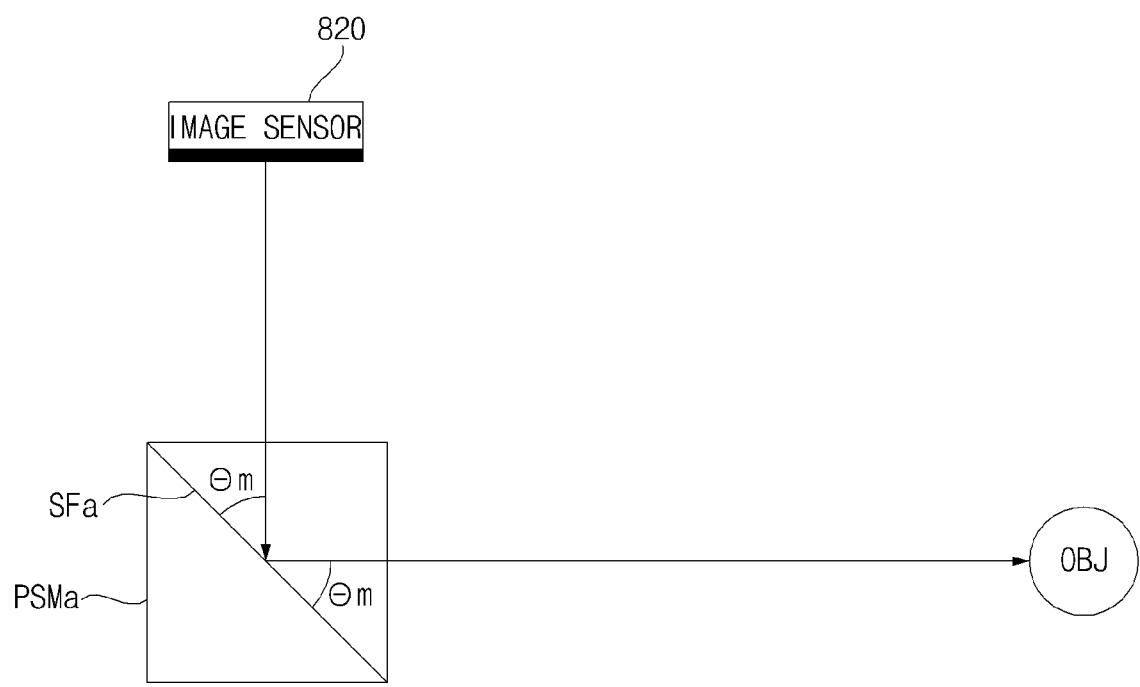
Figure 11B:
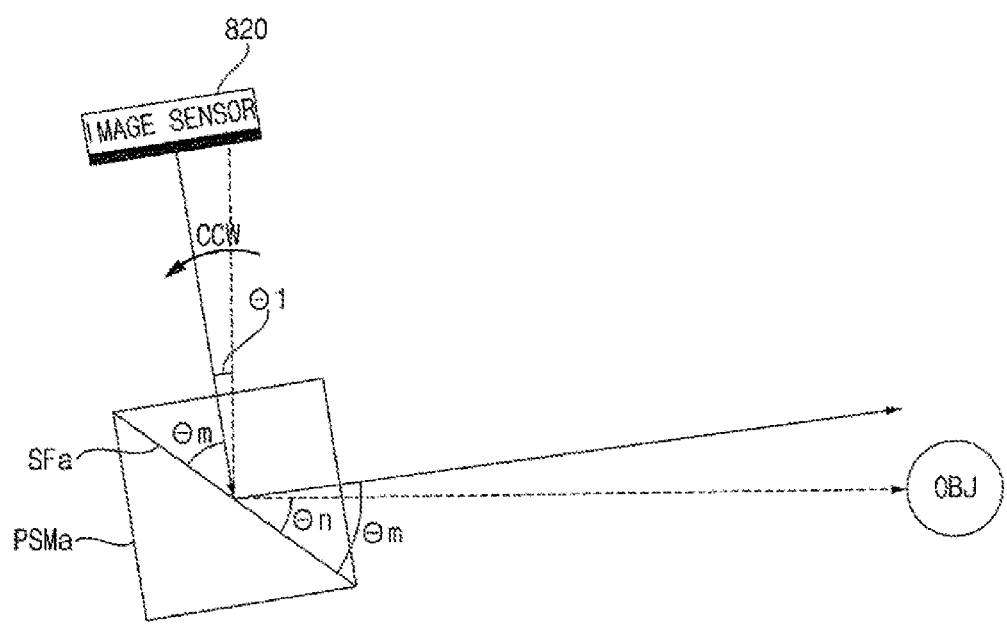
Figure 11C:
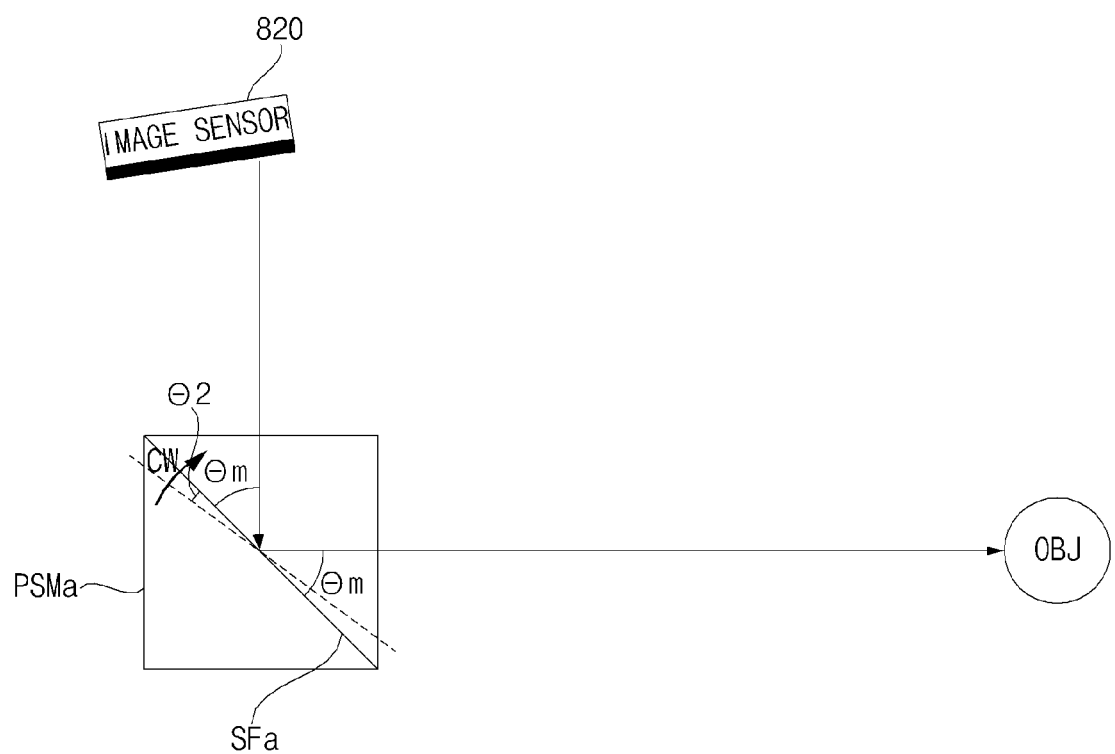

FIGS. 11A to 11C are diagrams for explaining a motion of hand tremor and the optical image stabilization (OIS) due to the motion of the hand tremor.

Hereinafter, for convenience of explanation, the image sensor 820, the first prism PSMa, and a front object OBJ will be described.

Firstly, FIG. 11A illustrates that the first prism PSMa disposed between the front object OBJ and the image sensor 820 is fixed, when there is no user's hand tremor.

Referring to FIG. 11A, the image sensor 820 and the reflection surface SFa of the first prism PSMa may have an angle θm, and the angle between the reflection surface SFa of the first prism PSMa and the front object OBJ may be the same angle θm. Here, the angle θm may be approximately 45 degrees.

According to this, the image sensor 820 may capture light for the front object OBJ, through the light which is reflected and inputted by the reflection surface SFa of the first prism PSMa, and convert the captured light into an electric signal. Therefore, image conversion for the front object OBJ can be achieved.

Next, FIG. 11B illustrates that the first prism PSMa disposed between the front object OBJ and the image sensor 820 rotates in the counterclockwise direction CCW by the first angle θ1, when the user's hand tremor is generated in the counterclockwise direction CCW by the first angle θ1.

Referring to FIG. 11B, the image sensor 820 and the reflection surface SFa of the rotated first prism PSMa may have an angle θm, but the angle between the reflection surface SFa of the rotated first prism PSMa and the front object OBJ may be θn smaller than the angle θm.

In other words, the image sensor 820 and the reflection surface SFa of the rotated first prism PSMa have an angle θm, and the front object OBJ does not exist in the direction of the angle θm from the reflection surface SFa of the rotated first prism PSMa.

Therefore, the image sensor 820 cannot capture the light for the front object OBJ, through the light which is reflected and inputted by the reflection surface SFa of the first prism PSMa. Thus, the first actuator ACTa may rotate the first prism PSMa at the second angle θ2 which is half of the first angle θ1, in the clockwise direction CW.

FIG. 11C illustrates that the first prism PSMa is rotated by the second angle θ2 which is half of the first angle θ1 in the clockwise direction CW, in order to perform optical image stabilization (OIS) for compensating the user's hand tremor.

Accordingly, like FIG. 11A, the image sensor 820 and the reflection surface SFa of the rotated first prism PSMa may have an angle θm, and the angle between the reflection surface SFa of the rotated first prism PSMa and the front object OBJ may be θm.

According to this, the image sensor 820 may capture the light for the front object OBJ, through the light reflected and inputted by the reflection surface SFa of the first prism PSMa, and convert the light into an electric signal. Therefore, in spite of the hand tremor, the image conversion for the front object OBJ can be stably achieved through the optical image stabilization (OIS).

As described in the description of FIG. 8A to FIG. 10, when the first prism PSMa is rotated in the first clockwise direction CW based on the first rotation axis Axa due to the user's hand tremor, the drive controller DRC may control the first prism PSMa, a first sensor magnet SMa, and the like to rotate in the counterclockwise direction CCW based on the first rotation axis Axa, by using the first rotary actuator ACTa, particularly, the first drive magnet DMa and the first drive coil DCLa so as to perform optical image stabilization (OIS).

Particularly, when the first control signal Saca from the drive controller DRC is applied to the first drive coil DCLa in the first actuator ACTa, a Lorentz force may be generated between the first drive coil DCLa and the first drive magnet DMa, so that the first drive magnet DMa can rotate in the counterclockwise direction CCW.

At this time, the first hall effect sensor Hsa may sense a change in the magnetic field that is variable, by the counterclockwise CCW rotation of the first sensor magnet SMa.

Meanwhile, when the range of the rotation angle of the clockwise direction (CW) due to the hand tremor is between approximately 10 degrees and −10 degrees, the angle compensation range due to the rotation in the counterclockwise direction (CCW) may be 5 degrees and −5 degrees which is half of the range of the rotation angle of clockwise direction (CW) due to the hand tremor.

Figure 12A:
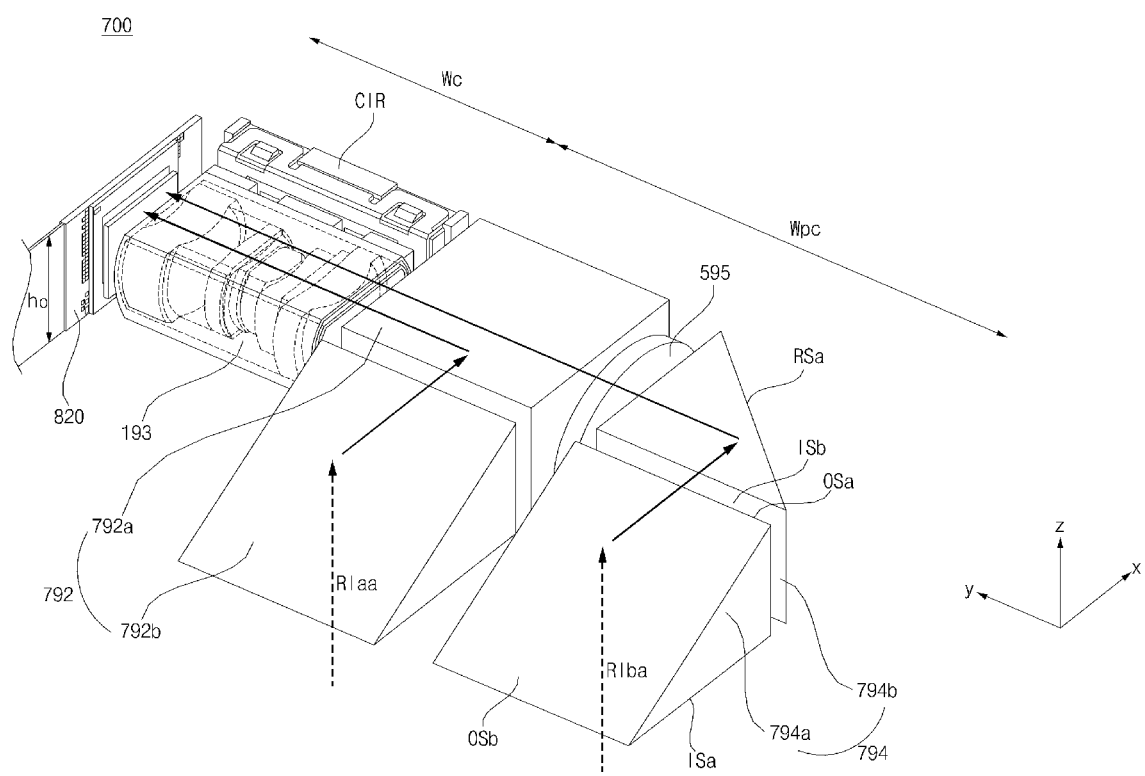
FIG. 12A is a diagram illustrating an example of a camera having a first prism apparatus and a second prism apparatus according to another embodiment of the present invention.
Figure 12B:
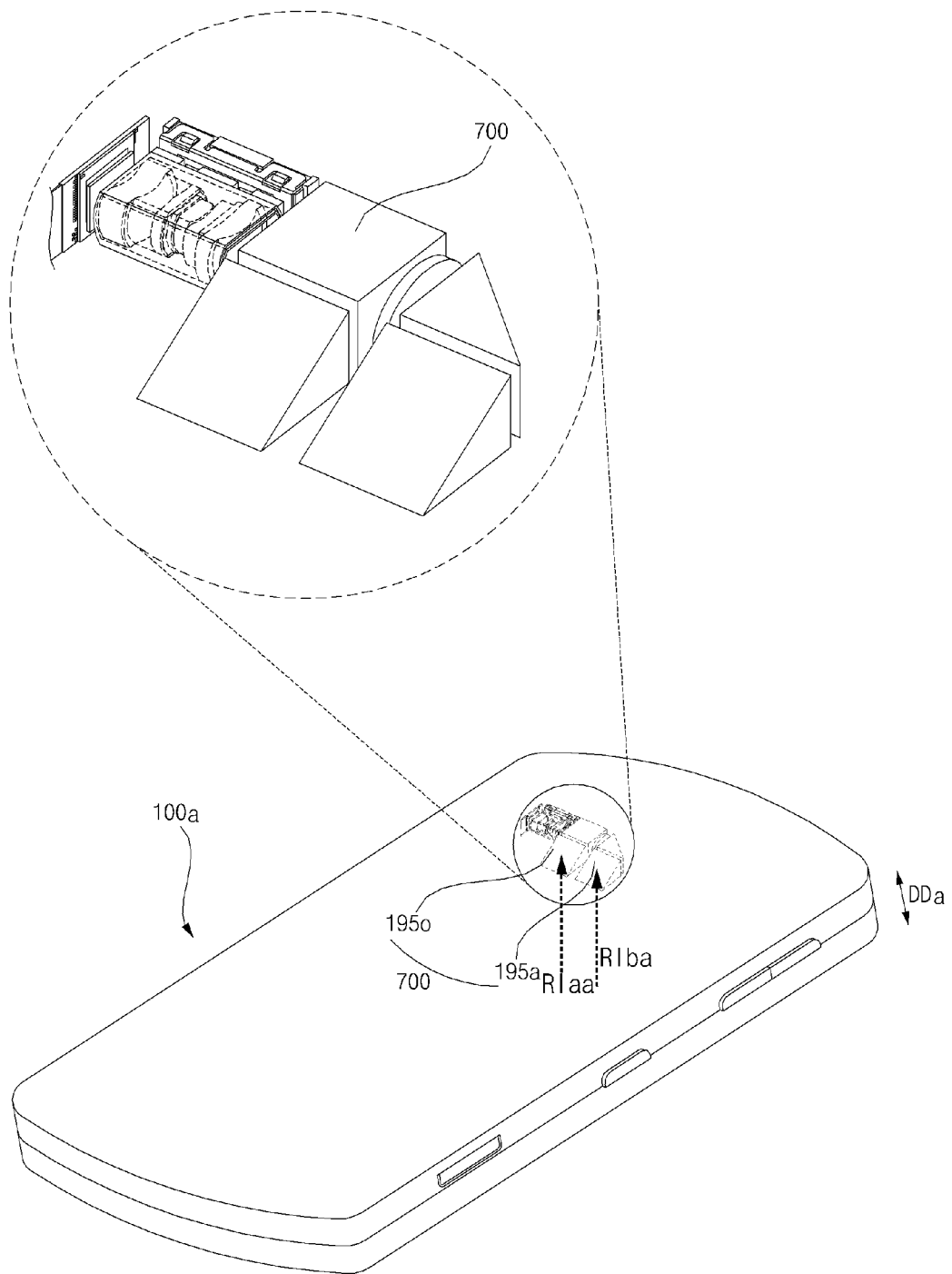
FIG. 12B is a diagram illustrating a mobile terminal having the camera of FIG. 12A.

FIG. 12A is a diagram illustrating an example of a camera having a first prism apparatus and a second prism apparatus according to another embodiment of the present invention, and FIG. 12B is a diagram illustrating a mobile terminal having the camera of FIG. 12A.

Referring to FIG. 12A, the camera 700 may include a first prism apparatus 792, a second prism apparatus 794, a lens apparatus 193, and an image sensor 820.

Meanwhile, the first prism apparatus 792 and the second prism apparatus 794 may be referred to as a dual prism apparatus as a single module.

The first prism apparatus 792 may reflect the third input light Riaa input in the third direction (z direction) to the second direction (y direction).

The first prism apparatus 792 may include a first prism 792a that reflects a third input light Riaa input in the third direction (z direction), and a second prism 792b that reflects the third input light Riaa from the first prism 792a and transmits a fourth input light Riba from the second prism apparatus 794.

Meanwhile, the second prism apparatus 794 may reflect the fourth input light Riba input in the third direction (z direction) to the second direction (y direction) and output the reflected light to the first prism apparatus 792.

To this end, the second prism apparatus 794 may include a third prism 794a that reflects the fourth input light Riba input in the third direction (z direction), and a fourth prism 794b that reflects the fourth input light Riba from the third prism 794a and output the reflected light to the second direction (y direction).

Meanwhile, the lens apparatus 193 may receive the third input light Riaa from the first prism apparatus 792 or the fourth input light Riba from the second prism apparatus 794, and may be provided with a plurality of lenses adjusted for variable focus.

The image sensor 820 may generate an image signal based on the third input light Riaa or the fourth input light Riba passing through the lens apparatus 193.

Meanwhile, the first prism apparatus 792 may serve as a front camera 195a, and the second prism apparatus 794 may serve as a front camera 195o.

Accordingly, it is possible to implement a slim camera 700 that can use a single image sensor 820 with respect to a plurality of cameras at the time of the front photographing.

Meanwhile, the image sensor 820 may generate a third image signal based on the third input light Riaa passing through the lens apparatus 193, in the third period, and generate a fourth image signal based on the fourth input light Riba passing through the lens apparatus 193, in the fourth period after the third period. Accordingly, it is possible to implement the slim camera 700 which can use a single image sensor 820 with respect to a plurality of cameras, in a different period.

Meanwhile, the resolution of the first image based on the third image signal is higher than the resolution of the second image based on the fourth image signal. Accordingly, it is possible to acquire images of different resolutions with respect to a plurality of cameras at the time of photographing.

Meanwhile, in the lens apparatus 193, the movement of the lens in the lens apparatus 193 during the third period is different from the movement of the lens in the lens apparatus 193 during the fourth period. Accordingly, it is possible to acquire images of different magnifications at the time of photographing.

Meanwhile, the camera 700 may further include a lens 595 disposed between the first prism apparatus 792 and the second prism apparatus 794. Accordingly, it is possible to acquire images of different magnifications at the time of photographing.

Meanwhile, FIG. 12A illustrates that the length of the lens apparatus 193 is denoted by Wa, the length of the first prism apparatus 792 and the second prism apparatus 794 is denoted by Wpa, and the height of the lens apparatus 193, the first prism apparatus 792, and the second prism apparatus 794 is denoted by ha.

Meanwhile, the camera 700 of FIG. 12 may include a first camera 195a and a second camera 195o, as a front stereo camera.

Meanwhile, FIG. 12B illustrates the mobile terminal 100a equipped with the camera 500 of FIG. 12A. Referring to FIG. 12B, the third input light Riaa input on the first prism apparatus 792 may be inputted through the front surface of the mobile terminal 100a, and the fourth input light Riba input on the second prism apparatus 794 may be inputted through the front surface of the mobile terminal 100a.

Therefore, the thickness DDa of the mobile terminal 100a may be determined not by the sum (Wa+Wpa) of the lengths of the lens apparatus 193, the first prism apparatus 792, and the second prism apparatus 794, but by the height ha of the lens apparatus 193, the first prism apparatus 792, and the second prism apparatus 794, or the height ho of the image sensor.

Accordingly, as the height ha of the lens apparatus 193, the first prism apparatus 792, and the second prism apparatus 794, or the height ho of the image sensor is designed to be low, the thickness DDa of the mobile terminal 100a can be slimly implemented. Accordingly, the slim camera 700 having a thin thickness and the mobile terminal 100a having the slim camera 700 can be implemented.

Further, by using a single image sensor with respect to a plurality of cameras 195a and 195o at the time of rear photographing, the manufacturing cost and the like can be reduced.

Figure 13A:
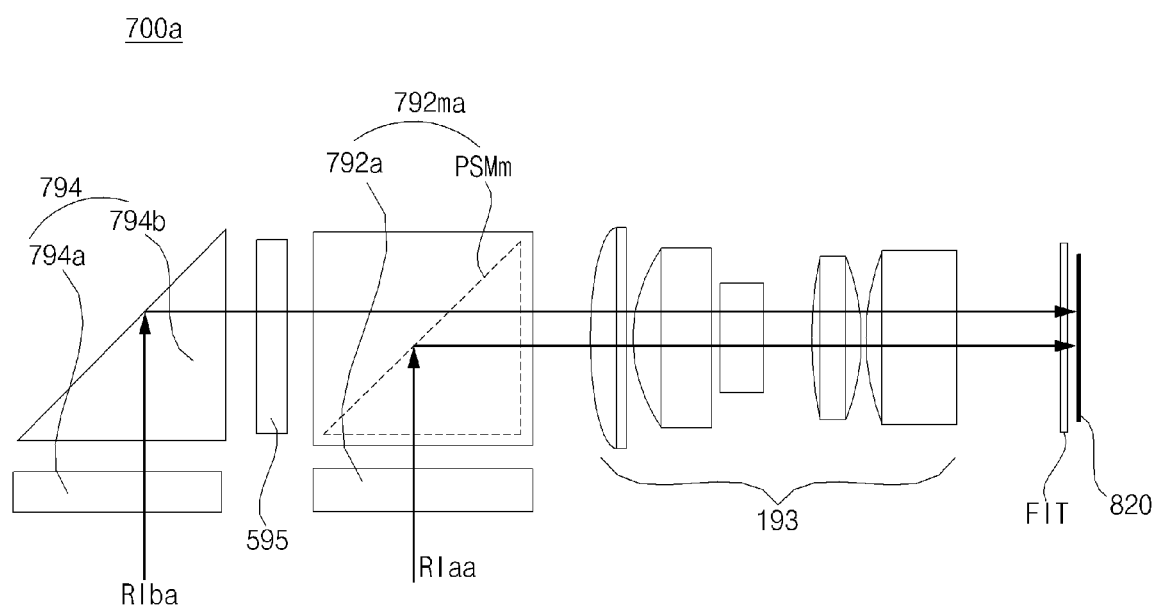
FIG. 13A to FIG. 13C are diagrams illustrating various examples of the first prism apparatus of FIG. 12A.
Figure 13B:
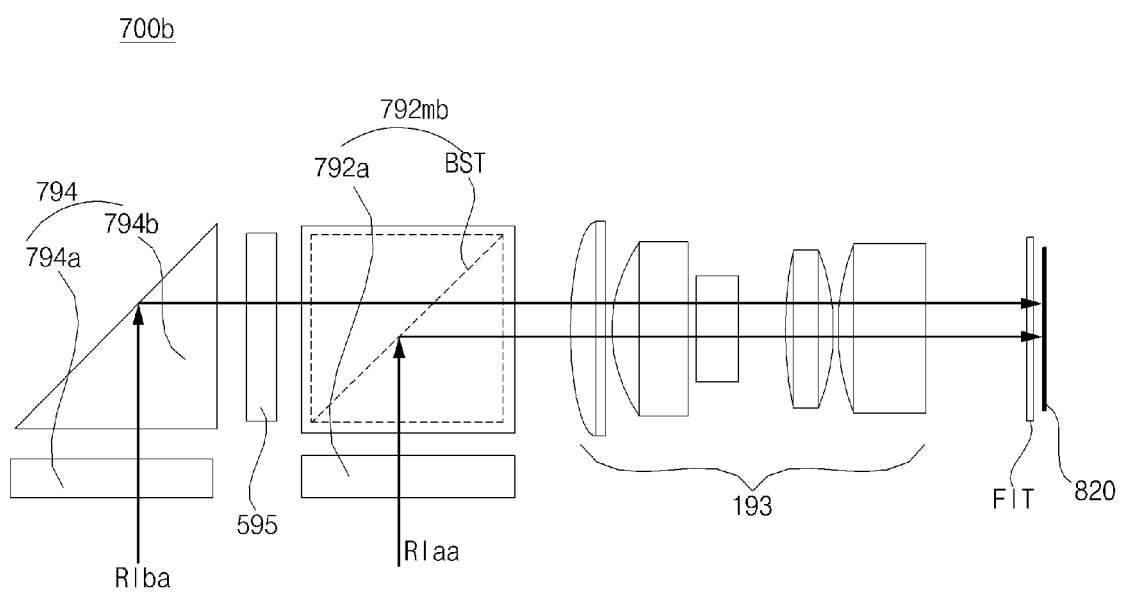
Figure 13C:
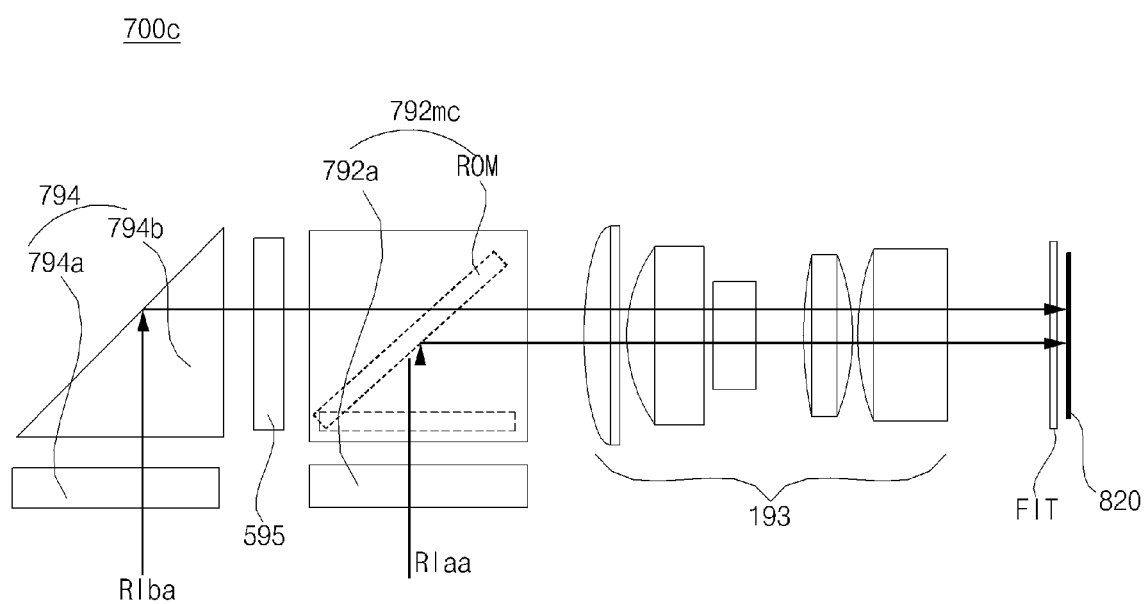

FIG. 13A to FIG. 13C are diagrams illustrating various examples of the first prism apparatus of FIG. 12A.

FIG. 13A to FIG. 13C illustrate various cameras 700a to 700c equipped with a first prism apparatus, a second prism apparatus 794, a lens 595, a lens apparatus 193, a filter FIT, an image sensor 820.

In particular, the cameras of FIGS. 13A to 13C may be a front stereo camera, and the third input light Riaa and the fourth input light Riba are inputted from the front direction.

First, in the camera 700a of FIG. 13A, the second prism apparatus 794 includes a third prism 794a and a fourth prism 794b, and the first prism apparatus 792ma includes the first prism 792a, and a second prism PSMm.

The first prism 792a may reflect the third input light Riaa input in the third direction (z direction), and the second prism PSMm may reflect the third input light Riaa from the first prism PSMa, and may transmit the fourth input light Riba from the second prism apparatus 794. Accordingly, it is possible to implement a slim camera 700 that can use a single image sensor 820 with respect to a plurality of cameras at the time of front photographing.

Next, in the camera 700b of FIG. 13B, the second prism apparatus 794 includes a third prism 794a and a fourth prism 794b, and the first prism apparatus 792mb includes a first prism 792a and a beam splitter BST.

The first prism 792a may reflect the third input light Riaa input in the third direction (z direction), and the beam splitter BST may reflect the third input light Riaa from the first prism PSMa and may transmit the fourth input light Riba from the second prism apparatus 794. Accordingly, it is possible to implement a slim camera 700 that can use a single image sensor 820 with respect to a plurality of cameras at the time of the front photographing.

Next, in the camera 700c of FIG. 13C, the second prism apparatus 794 includes a third prism 794a and a fourth prism 794b, and the first prism apparatus 792mc includes a first prism 792a, and a rotating mirror (ROM).

The first prism 792a may reflect the third input light Riaa input in the third direction (z direction), and the rotating mirror ROM may rotate by a certain angle so as to reflect the third input light Riaa from the first prism PSMa in the third period, and may stop to transmit the fourth input light Riba from the second prism apparatus 794 in the fourth period. Accordingly, it is possible to implement the slim camera 700 that can use a single image sensor 820 with respect to a plurality of cameras at the time of the front photographing.

Figure 14:
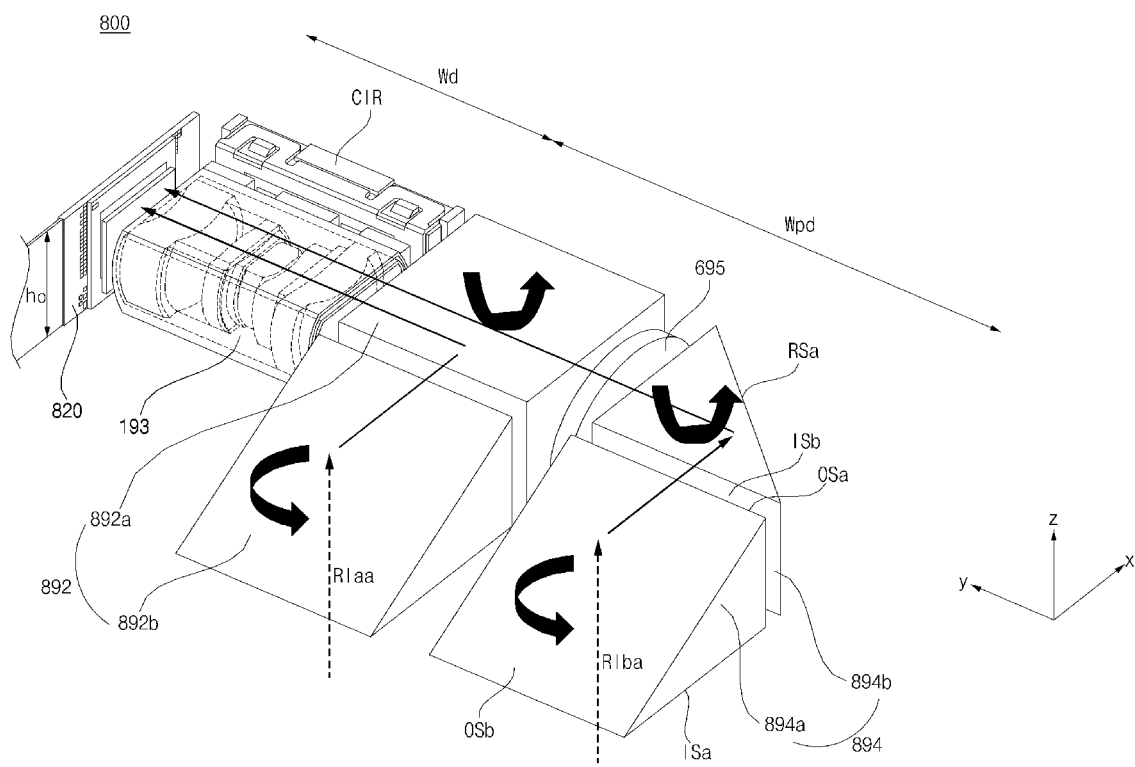
FIG. 14 is a diagram illustrating an example of a camera having a first prism apparatus and a second prism apparatus according to another embodiment of the present invention.

FIG. 14 is a diagram illustrating an example of a camera having a first prism apparatus and a second prism apparatus according to another embodiment of the present invention.

Referring to drawing, the camera 800 of FIG. 14 may include a first prism apparatus 892, a second prism apparatus 894, a lens apparatus 193, and an image sensor 820.

Meanwhile, the first prism apparatus 892 and the second prism apparatus 894 may be referred to as a dual prism apparatus as a single module.

The first prism apparatus 892 may reflect the third input light Riaa input in the third direction (z direction) to the second direction (y direction).

To this end, the first prism apparatus 892 may include a first prism module 892a that reflects the third input light Riaa input in the third direction (z direction), and a second prism module 892b that reflects the third input light Riaa from the first prism module 892a and transmits the fourth input light Riba from the second prism apparatus 894.

Meanwhile, the second prism apparatus 894 may reflect the fourth input light Riba input in the third direction (z direction) to the second direction (y direction), and output the reflected light to the first prism apparatus 892.

To this end, the second prism apparatus 894 may include a third prism module 894a that reflects the fourth input light Riba input in the third direction (z direction), and a fourth prism module 894b that reflects the fourth input light Riba from the third prism module 894a and outputs the reflected light in the second direction (y direction).

Meanwhile, the lens apparatus 193 may receive the third input light Riaa from the first prism apparatus 892 or the fourth input light Riba from the second prism apparatus 894, and may be provided with a plurality of lenses adjusted for variable focus.

The image sensor 820 may generate an image signal based on the third input light Riaa or the fourth input light Riba passing through the lens apparatus 193.

Meanwhile, the first prism apparatus 892 may serve as a front camera 195a, and the second prism apparatus 894 may serve as a front camera 195o.

Accordingly, it is possible to implement a slim camera 800 that can use a single image sensor 820 with respect to a plurality of cameras at the time of the front photographing.

Meanwhile, the image sensor 820 may generate a third image signal based on the third input light Riaa passing through the lens apparatus 193 in a third period, and generate a fourth image signal based on the fourth input light Riba passing through the lens apparatus 193 in a fourth period after the third period. Accordingly, it is possible to implement the slim camera 800 that can use the single image sensor 820 with respect to a plurality of cameras at the time of the front photographing, in a different period.

Meanwhile, the resolution of the first image based on the third image signal is higher than the resolution of the second image based on the fourth image signal. Accordingly, it is possible to acquire images of different resolutions with respect to a plurality of cameras at the time of photographing.

Meanwhile, in the lens apparatus 193, the movement of the lens in the lens apparatus 193 during the third period is different from the movement of the lens in the lens apparatus 193 during the fourth period. Accordingly, images of different magnifications can be acquired at the time of photographing.

Meanwhile, the camera 800 may further include a lens 695 disposed between the first prism apparatus 892 and the second prism apparatus 894. Accordingly, images of different magnifications can be acquired at the time of photographing.

Meanwhile, the camera 800 of FIG. 14 is similar to the camera 700 of FIG. 12A, but has a difference in that an angle compensation for the optical image stabilization (OIS) is performed with respect to the first prism apparatus 892 or the second prism apparatus 894.

For example, the first prism module 892a and the second prism module 892b in the first prism apparatus 892 may rotate on different axes, respectively, due to hand tremor, and an optical image stabilization (OIS) for the compensation of the hand tremor may be performed for each of the first prism module 892a and the second prism module 892b.

As another example, the third prism module 894a and the fourth prism module 894b in the second prism apparatus 894 may rotate on different axes, respectively, due to hand tremor, and an optical image stabilization (OIS) for the compensation of the hand tremor may be performed for each of the third prism module 894a and the fourth prism module 894b.

Hereinafter, an angle compensation scheme for the optical image stabilization (OIS) of the first prism apparatus 892 is described, but the present invention is not limited thereto. The angle compensation for the optical image stabilization (OIS) of the second prism apparatus 894 also can be achieved.

Figure 15A:
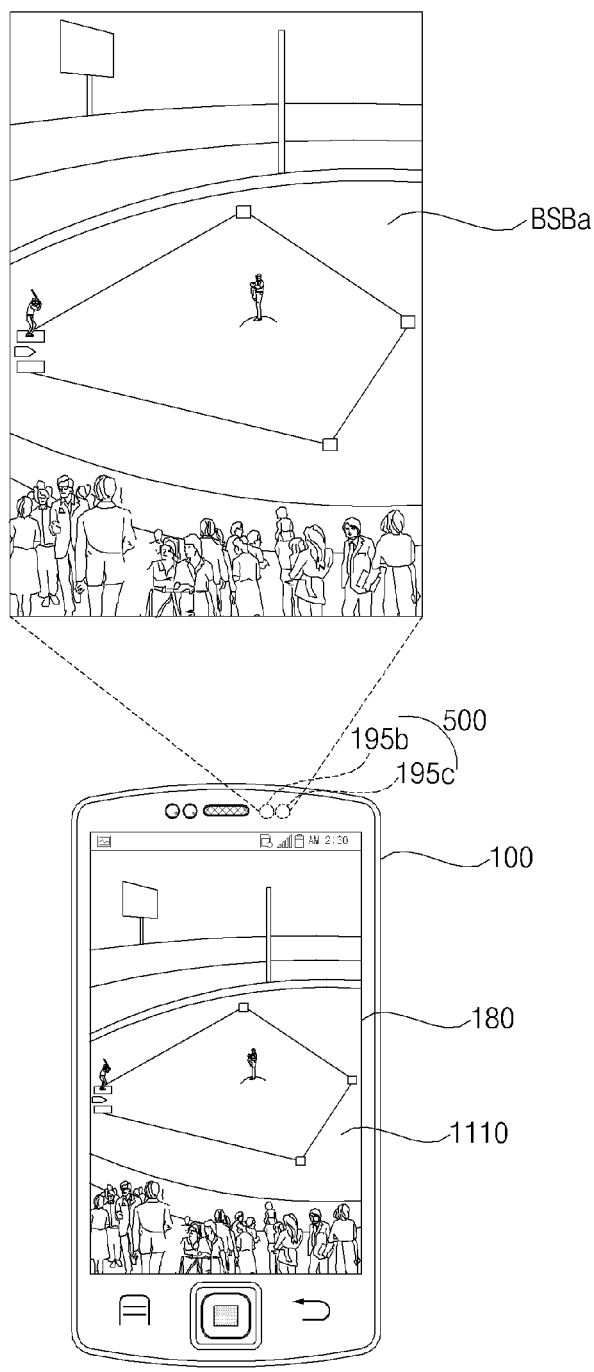
FIG. 15A to FIG. 15C are diagrams for explaining the camera of FIG. 5A or FIG. 12A.
Figure 15B:
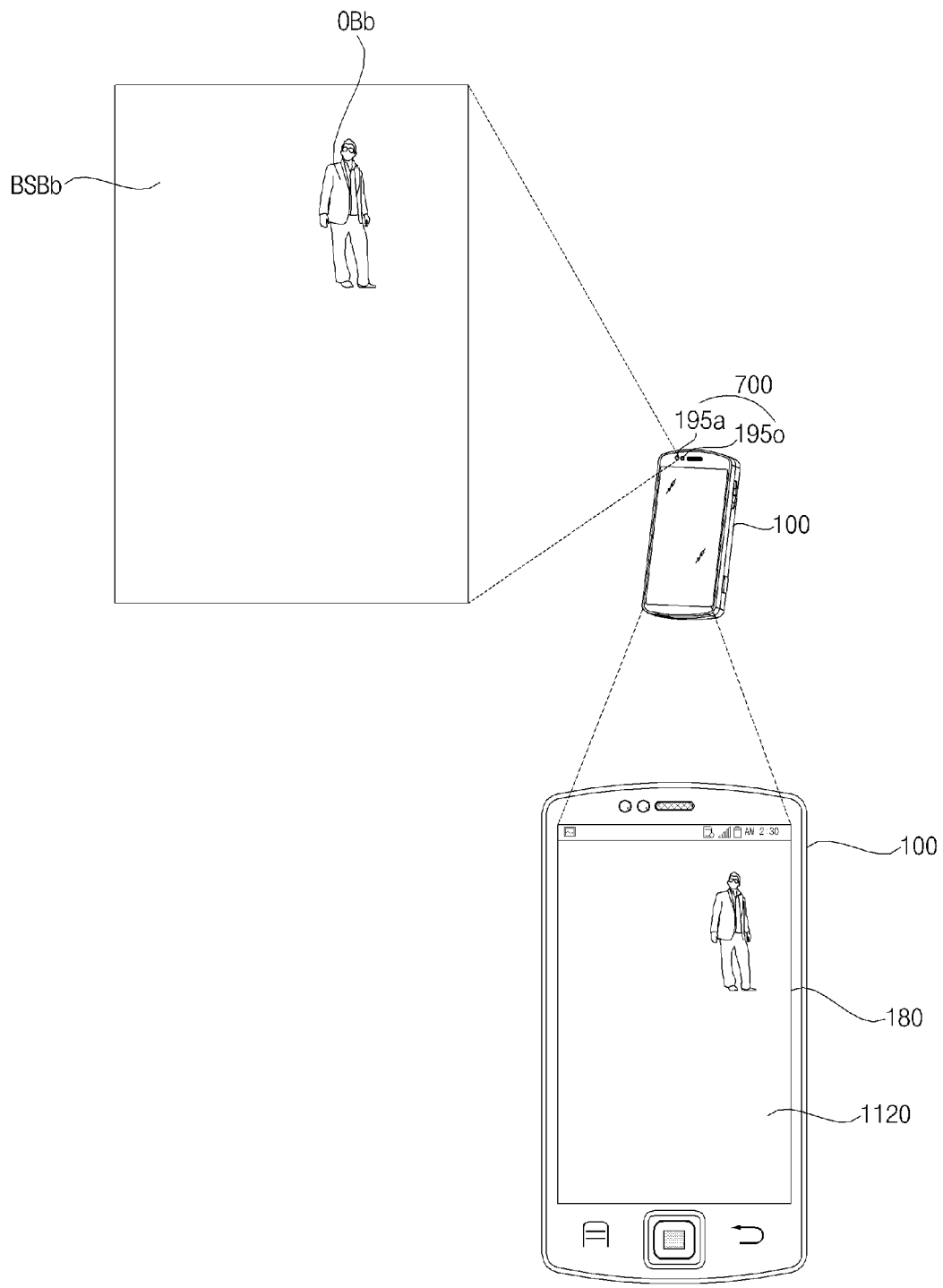
Figure 15C:
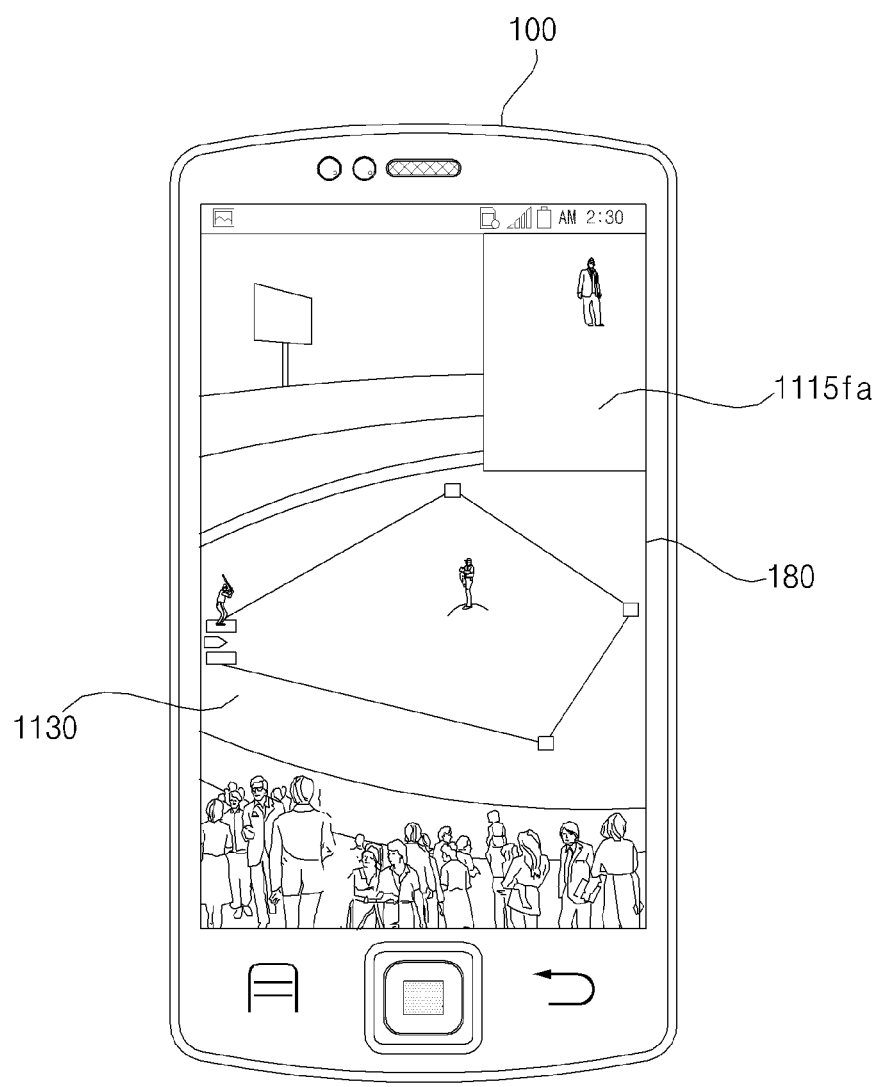

FIGS. 15A to 15C illustrate that images photographed by the camera described in FIGS. 5 to 14 are displayed.

Firstly, FIG. 15A illustrates a photographed image by a rear camera described in FIGS. 5 to 11C.

Specifically, the image sensor 820 may generate a first image signal corresponding to the background (BSBa), based on the first input light Ria input through the first prism apparatus 592, 692 in the first period.

In addition, the image sensor 820 may generate a second image signal corresponding to the background (BSBa), based on the second input light Rib input through the second prism apparatuses 594, 694 in the second period.

In addition, the controller 170 of the mobile terminal 100 may control the display 180 to display a first image 1110 based on at least one of the first image signal and the second image signal.

At this time, the first image 1110 may be generated based on one of the first image signal and the second image signal, or may be generated by a combination of the first image signal and the second image signal.

Next, FIG. 15B illustrates the image photographed by a plurality of front cameras described in FIGS. 12A to 14.

Specifically, the image sensor 820 may generate a third image signal corresponding to the foreground BSBb, based on the third input light Riaa input through the first prism apparatus 792, 892 in the third period.

In addition, the image sensor 820 may generate a fourth image signal corresponding to the foreground BSBb, based on the fourth input light Riba input through the second prism apparatus 794, 894 in the fourth period.

In addition, the controller 170 of the mobile terminal 100 may control the display 180 to display a second image 1120 based on at least one of the third image signal and the fourth image signal.

At this time, the second image 1120 may be generated based on any one of the third image signal and the fourth image signal, or may be generated by a combination of the third image signal and the fourth image signal.

Next, FIG. 15C is a diagram illustrating that the image of FIG. 15A and the image of FIG. 15B are displayed together.

The controller 170 of the mobile terminal 100 may synthesize the image 1110 acquired by the rear camera with the image 1120 acquired by the front camera, and may control to display the synthesized image 1130 as shown in the drawing.

In the drawing, it is illustrated that the image 1120 acquired by the front camera is synthesized, based on the image 1110 acquired by the rear camera, and the reduced image 1115fa is displayed in the upper portion of the image 1130, and vice versa.

As described above, since a single image sensor can be used with respect to a plurality of cameras at the time of the front photographing or the rear photographing, it is possible to implement a slim camera and display various images. In addition, the manufacturing cost of a camera or the like can be reduced.

Meanwhile, the cameras 500, 600, 700, 800 having the first prism apparatus and the second prism apparatus described with reference to FIGS. 5 to 15C may be employed in various electronic apparatuses such as the mobile terminal 100 of FIG. 2, a vehicle, TV, a drone, a robot, a robot cleaner, a door, and the like.

As described above, a camera and a terminal including the same according to an embodiment of the present invention includes: a first prism apparatus configured to reflect a first input light input in a first direction to a second direction; a second prism apparatus configured to reflect a second input light input in the first direction to the second direction, and output the reflected second input light to the first prism apparatus; a lens apparatus including a plurality of lenses adjusted for variable focus, and configured to receive the first input light from the first prism apparatus or the second input light from the second prism apparatus; and an image sensor configured to generate an image signal based on the first input light or the second input light passing through the lens apparatus. Accordingly, it is possible to implement a slim camera that can use a single image sensor with respect to a plurality of cameras at the time of front photographing or rear photographing.

The first prism apparatus includes: a first prism configured to reflect the first input light input in the first direction; and a second prism configured to reflect the first input light from the first prism and transmit the second input light from the second prism apparatus. Accordingly, it is possible to implement a slim camera that can use a single image sensor with respect to a plurality of cameras at the time of front photographing or rear photographing.

The first prism apparatus includes: a prism configured to reflect the first input light input in the first direction; and a beam splitter configured to reflect the first input light from the first prism and transmit the second input light from the second prism apparatus. Accordingly, it is possible to implement a slim camera that can use a single image sensor with respect to a plurality of cameras at the time of front photographing or rear photographing.

The first prism apparatus includes: a prism configured to reflect the first input light input in the first direction; and a rotating mirror configured to reflect the first input light from the first prism and transmit the second input light from the second prism apparatus. Accordingly, it is possible to implement a slim camera that can use a single image sensor with respect to a plurality of cameras at the time of front photographing or rear photographing.

The image sensor generates a first image signal based on the first input light passing through the lens apparatus in a first period, and generates a second image signal based on the second input light passing through the lens apparatus in a second period after the first period. Accordingly, it is possible to implement a slim camera that can use a single image sensor with respect to a plurality of cameras at the time of front photographing or rear photographing, in a different period.

A resolution of a first image based on the first image signal is higher than a resolution of a second image based on the second image signal. Accordingly, it is possible to acquire images of different resolutions with respect to a plurality of cameras at the time of photographing.

In the lens apparatus, a movement of lens in the lens apparatus during the first period is different from a movement of lens in the lens apparatus during the second period. Accordingly, images of different magnifications can be acquired at the time of photographing.

The camera further includes a lens disposed between the first prism apparatus and the second prism apparatus. Accordingly, images of different magnifications can be acquired at the time of photographing.

The first prism apparatus includes: a first actuator configured to change an angle of the first prism about a first rotation axis so as to change a first reflection direction, based on an inputted first control signal; and a second actuator configured to change an angle of the second prism about a second rotation axis so as to change a second reflection direction, based on an inputted second control signal. Accordingly, it is possible to implement the optical image stabilization (OIS) function for the dual prism. In particular, the dual prism can be rotationally driven independently, and the optical image stabilization (OIS) function can be implemented based on a plurality of rotation axes. In particular, since the optical paths of the first prism and the second prism are different from each other, it is possible to implement an L-type camera, and thus a slim camera having a reduced thickness can be implemented.

The first prism receives an input light through a first entry prism surface and outputs the input light reflected from a first internal reflection surface through a first exit prism surface, and the second prism receives the reflected input light through a second entry prism surface and outputs the reflected light reflected from a second internal reflection surface through a second exit prism surface. Accordingly, it is possible to implement the optical image stabilization (OIS) function for the dual prism.

The first exit prism surface of the first prism and the second entry prism surface of the second prism face each other. Accordingly, it is possible to implement the optical image stabilization (OIS) function for the dual prism.

The first rotation axis of the first prism is perpendicular to the second rotation axis of the second prism. Accordingly, it is possible to implement the optical image stabilization (OIS) function for the dual prism.

In response to a movement causing rotation of the first prism about the first rotation axis by a first angle and rotation of the second prism about the second rotation axis by a second angle, the first actuator is configured to rotate the first prism in the first direction by a third angle in response to the first control signal, the second actuator is configured to rotate the second prism in a fourth direction opposite to the second direction by a fourth angle in response to the second control signal, the third angle is half of the first angle, and the fourth angle is half of the second angle. Accordingly, since the compensation angle at the time of the optical image stabilization (OIS) becomes small, the accuracy of the optical image stabilization (OIS) function can be improved.

The first prism apparatus includes: a first hall effect sensor configured to sense an angle change of the first prism based on a first magnetic field; and a second hall effect sensor configured to sense an angle change of the second prism based on a second magnetic field. Accordingly, it is possible to implement the optical image stabilization (OIS) function for the dual prism.

The first actuator includes a first drive magnet and a first drive coil. Accordingly, it is possible to implement the optical image stabilization (OIS) function for the dual prism.

The camera further includes: a first prism holder configured to secure the first prism; a first yoke coupled to a rear of the first prism holder; the first drive magnet coupled to a rear of the first yoke; a first coil holder including a plurality of protrusions protruding toward the first prism holder, wherein each of the plurality of protrusions includes an opening, and wherein the opening defines the first rotation axis, the first drive coil is disposed between the first coil holder and the first yoke, and the first prism holder includes a plurality of bosses coupled with the openings of the plurality of protrusions so as to rotate the first prism about the first rotation axis. Accordingly, the first drive magnet, the first prism holder, and the first prism can be rotated about the first rotation axis.

The second actuator includes a second drive magnet and a second drive coil. Accordingly, it is possible to implement the optical image stabilization (OIS) function for the second prism.

The camera further includes: a second prism holder configured to secure the second prism; a second yoke coupled to a rear of the second prism holder; the second drive magnet coupled to a rear of the second yoke; a second coil holder including a plurality of protrusions protruding toward the second prism holder, wherein each of the plurality of protrusions includes an opening, and wherein the opening defines the second rotation axis, wherein the second drive coil is disposed between the second coil holder and the second yoke, wherein the second prism holder includes a plurality of bosses coupled with the openings of the plurality of protrusions so as to rotate the second prism about the second rotation axis. Accordingly, the second drive magnet, the second prism holder, and the second prism can be rotated about the second rotation axis.

The camera further includes: a gyro sensor configured to sense a movement of the camera; and a drive controller configured to generate the first control signal and the second control signal for stabilizing an image being captured by the image sensor, wherein the first control signal is based on the angle change of the first prism caused by the movement, and the second control signal is based on the angle change of the second prism caused by the movement. Accordingly, it is possible to implement the optical image stabilization (OIS) function for the dual prism. In particular, the dual prism can be rotationally driven independently, and the optical image stabilization (OIS) function can be implemented based on a plurality of rotation axes.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:
1. A camera comprising:
a first prism apparatus configured to reflect a first input light input in a first direction to a second direction;
a second prism apparatus configured to reflect a second input light input in the first direction to the second direction, and output the reflected second input light to the first prism apparatus;
a lens apparatus including a plurality of lenses adjustable for variable focus, and configured to receive the first input light from the first prism apparatus or the second input light from the second prism apparatus; and an image sensor configured to generate an image signal based on the first input light or the second input light passing through the lens apparatus, wherein the first prism apparatus comprises:
a prism configured to reflect the first input light input in the first direction; and
a rotating mirror configured to reflect the first input light reflected from the prism and transmit the second input light output from the second prism apparatus.

2. The camera of claim 1, wherein the image sensor is further configured to:
generate a first image signal based on the first input light passing through the lens apparatus in a first period; and
generate a second image signal based on the second input light passing through the lens apparatus in a second period after the first period.

3. The camera of claim 2, wherein a resolution of a first image based on the first image signal is higher than a resolution of a second image based on the second image signal.

4. The camera of claim 2, wherein, in the lens apparatus, a movement of lens in the lens apparatus during the first period is different from a movement of lens in the lens apparatus during the second period.

5. The camera of claim 1, further comprising a lens disposed between the first prism apparatus and the second prism apparatus.

6. A camera comprising:
a first prism apparatus configured to reflect a first input light input in a first direction to a second direction;
a second prism apparatus configured to reflect a second input light input in the first direction to the second direction, and output the reflected second input light to the first prism apparatus;
a lens apparatus including a plurality of lenses adjustable for variable focus, and configured to receive the first input light from the first prism apparatus or the second input light from the second prism apparatus; and
an image sensor configured to generate an image signal based on the first input light or the second input light passing through the lens apparatus, wherein the first prism apparatus comprises:
a first prism configured to reflect the first input light input in the first direction;
a second prism configured to reflect the first input light reflected from the first prism and transmit the second input light output from the second prism apparatus;
a first actuator configured to change an angle of the first prism about a first rotation axis so as to change a first reflection direction, based on an input first control signal; and
a second actuator configured to change an angle of the second prism about a second rotation axis so as to change a second reflection direction, based on an input second control signal, and wherein the first rotation axis of the first prism is perpendicular to the second rotation axis of the second prism.

7. The camera of claim 6, wherein:
the first prism is further configured to receive an input light through a first entry prism surface and output the input light reflected from a first internal reflection surface through a first exit prism surface; and
the second prism is further configured to receive the reflected input light through a second entry prism surface and output the reflected light reflected from a second internal reflection surface through a second exit prism surface.

8. The camera of claim 7, wherein the first exit prism surface of the first prism and the second entry prism surface of the second prism face each other.

9. The camera of claim 6, wherein, in response to a movement causing rotation of the first prism about the first rotation axis by a first angle and rotation of the second prism about the second rotation axis by a second angle:
the first actuator is further configured to rotate the first prism in the first direction by a third angle in response to the first control signal; and
the second actuator is further configured to rotate the second prism in a fourth direction opposite the second direction by a fourth angle in response to the second control signal, wherein the third angle is half of the first angle, and
wherein the fourth angle is half of the second angle.

10. The camera of claim 6, wherein the first prism apparatus further comprises:
a first hall effect sensor configured to sense the changed angle of the first prism based on a first magnetic field; and
a second hall effect sensor configured to sense the changed angle of the second prism based on a second magnetic field.

11. The camera of claim 10, wherein the first actuator comprises a first drive magnet and a first drive coil.

12. The camera of claim 11, further comprising:
a first prism holder configured to secure the first prism;
a first yoke coupled to a rear of the first prism holder, the first drive magnet coupled to a rear of the first yoke; and
a first coil holder including a plurality of protrusions protruding toward the first prism holder, wherein:
each of the plurality of protrusions comprises an opening;
the opening defines the first rotation axis;
the first drive coil is disposed between the first coil holder and the first yoke; and
the first prism holder comprises a plurality of bosses coupled with the openings of the plurality of protrusions so as to rotate the first prism about the first rotation axis.

13. The camera of claim 12, wherein the second actuator comprises a second drive magnet and a second drive coil.

14. The camera of claim 13, further comprising:
a second prism holder configured to secure the second prism;
a second yoke coupled to a rear of the second prism holder, the second drive magnet coupled to a rear of the second yoke; and
a second coil holder including a plurality of protrusions protruding toward the second prism holder, wherein:
each of the plurality of protrusions of the second coil holder comprises an opening;
the opening of the protrusion of the second coil holder defines the second rotation axis;
the second drive coil is disposed between the second coil holder and the second yoke; and
the second prism holder comprises a plurality of bosses coupled with the openings of the plurality of protrusions of the second coil holder so as to rotate the second prism about the second rotation axis.

15. The camera of claim 9, further comprising:
a gyro sensor configured to sense a movement of the camera; and
a drive controller configured to generate the first control signal and the second control signal for stabilizing an image being captured by the image sensor,
wherein the first control signal is based on the changed angle of the first prism caused by the movement, and the second control signal is based on the changed angle of the second prism caused by the movement.

16. A terminal comprising a camera, wherein the camera comprises:
a first prism apparatus configured to reflect a first input light input in a first direction to a second direction;
a second prism apparatus configured to reflect a second input light input in the first direction to the second direction, and output the reflected second input light to the first prism apparatus;
a lens apparatus including a plurality of lenses adjustable for variable focus, and configured to receive the first input light from the first prism apparatus or the second input light from the second prism apparatus; and
an image sensor configured to generate an image signal based on the first input light or the second input light passing through the lens apparatus,
wherein the first prism apparatus comprises:
a prism configured to reflect the first input light input in the first direction; and
a rotating mirror configured to reflect the first input light reflected from the prism and transmit the second input light output from the second prism apparatus.

* * * * *